United States Patent
Kim et al.

(10) Patent No.: US 11,252,726 B2
(45) Date of Patent: Feb. 15, 2022

(54) METHOD AND APPARATUS FOR RESELECTING TX CARRIER FOR SIDELINK TRANSMISSION IN WIRELESS COMMUNICATION SYSTEM

(71) Applicant: LG ELECTRONICS INC., Seoul (KR)

(72) Inventors: Taehun Kim, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 131 days.

(21) Appl. No.: 16/576,642

(22) Filed: Sep. 19, 2019

(65) Prior Publication Data

US 2020/0267729 A1 Aug. 20, 2020

(30) Foreign Application Priority Data

Feb. 14, 2019 (KR) .................. 10-2019-0017466

(51) Int. Cl.
*H04W 72/04* (2009.01)
*H04W 84/04* (2009.01)

(52) U.S. Cl.
CPC ..... *H04W 72/0453* (2013.01); *H04W 72/042* (2013.01); *H04W 72/0406* (2013.01); *H04W 84/042* (2013.01)

(58) Field of Classification Search
CPC ............... H04L 1/1893; H04W 72/02; H04W 72/0406; H04W 72/042; H04W 72/0453; H04W 76/14; H04W 84/042
See application file for complete search history.

(56) References Cited

U.S. PATENT DOCUMENTS

| 9,655,164 | B2* | 5/2017 | Fong | H04L 5/0053 |
| 10,440,581 | B2* | 10/2019 | Belleschi | H04W 72/044 |
| 2015/0181638 | A1* | 6/2015 | Tabet | H04L 1/1893 |
| | | | | 370/228 |
| 2017/0048922 | A1* | 2/2017 | Lee | H04W 76/11 |
| 2017/0181206 | A1* | 6/2017 | Lee | H04W 28/06 |
| 2017/0332434 | A1* | 11/2017 | Lee | H04W 8/005 |
| 2018/0048433 | A1* | 2/2018 | Martin | H04L 1/1887 |
| 2018/0049084 | A1* | 2/2018 | Lee | H04W 36/0083 |
| 2018/0069618 | A1* | 3/2018 | Loehr | H04W 72/1263 |

(Continued)

OTHER PUBLICATIONS

3rd Generation Partnership Project (3GPP), "Technical Specification Group Radio Access Network; Evolved Universal Terrestrial Radio Access (E-UTRA); Physical layer; Measurements (Release 15)," 3GPP TS 36.214 V15.3.0, Sep. 2018, 25 pages.

(Continued)

*Primary Examiner* — Alpus Hsu
(74) *Attorney, Agent, or Firm* — Lee Hong Degerman Kang & Waimey

(57) ABSTRACT

A method and an apparatus for reselecting Tx carrier for sidelink transmission in wireless communication system is provided. The method, by a UE, may include selecting a first carrier upon which the wireless device performs first sidelink transmission based on the first carrier to a target wireless device, detecting a number of retransmissions unacknowledged on the first carrier, and performing second sidelink transmission to the target wireless device based on a second carrier different from the first carrier.

7 Claims, 15 Drawing Sheets

(56) References Cited

U.S. PATENT DOCUMENTS

| | | | |
|---|---|---|---|
| 2018/0084442 A1* | 3/2018 | Lee | H04L 5/0048 |
| 2019/0116475 A1* | 4/2019 | Lee | H04W 72/02 |
| 2019/0159174 A1* | 5/2019 | Seo | H04W 72/02 |
| 2019/0215685 A1* | 7/2019 | Wang | H04W 8/30 |
| 2019/0239178 A1* | 8/2019 | Shilov | H04W 56/002 |
| 2020/0068609 A1* | 2/2020 | Wang | H04W 72/0446 |
| 2020/0107330 A1* | 4/2020 | Chae | H04W 72/04 |
| 2020/0112982 A1* | 4/2020 | Li | H04L 5/0082 |
| 2020/0120674 A1* | 4/2020 | Lee | H04W 72/02 |
| 2020/0145799 A1* | 5/2020 | Baghel | H04L 5/0055 |
| 2020/0170059 A1* | 5/2020 | Belleschi | H04W 16/14 |
| 2020/0205165 A1* | 6/2020 | Huang | H04W 72/0446 |
| 2020/0205166 A1* | 6/2020 | Huang | H04W 72/00 |
| 2020/0229194 A1* | 7/2020 | Belleschi | H04W 72/0453 |
| 2020/0288431 A1* | 9/2020 | Lee | H04W 72/0446 |
| 2020/0344721 A1* | 10/2020 | Xing | H04L 5/00 |
| 2020/0383100 A1* | 12/2020 | Yu | H04W 72/0446 |

OTHER PUBLICATIONS

3rd Generation Partnership Project (3GPP), "Technical Specification Group Core Network and Terminals; User Equipment (UE) to V2X control function; protocol aspects; Stage 3 (Release 15)," 3GPP TS 24.386 V15.2.0, Dec. 2018, 35 pages.

3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.4.0, Dec. 2018, 363 pages.

3rd Generation Partnership Project (3GPP), "Technical Specification Group Radio Access Network; Evolved Universal Terrestrial Radio Access (E-UTRA); Medium Access Control (MAC) protocol specification (Release 15)," 3GPP TS 36.321 V15.3.0, Sep. 2018, 127 pages.

* cited by examiner

METHOD AND APPARATUS FOR RESELECTING TX CARRIER FOR SIDELINK TRANSMISSION IN WIRELESS COMMUNICATION SYSTEM

CROSS-REFERENCE TO RELATED APPLICATIONS

Pursuant to 35 U.S.C. § 119(a), this application claims the benefit of earlier filing date and right of priority to Korean Patent Application No. 10-2019-0017466, filed on Feb. 14, 2019, the contents of which are hereby incorporated by reference herein in its entirety.

BACKGROUND

Technical Field

The present disclosure relates to a method and apparatus for reselecting Tx carrier for sidelink transmission in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

NR is a technology that operates on a very wideband compared with LTE. In order to support flexible broadband operation, NR has the following design principles different from LTE in terms of broadband support.

Vehicle-to-everything (V2X) communication is the passing of information from a vehicle to any entity that may affect the vehicle, and vice versa. It is a vehicular communication system that incorporates other more specific types of communication as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G).

The main motivations for V2X are road safety, traffic efficiency, and energy savings. There are two types of V2X communication technology depending on the underlying technology being used, i.e. wireless local area network (WLAN)-based, and cellular-based.

SUMMARY

Carrier aggregation (CA) in sidelink for V2X sidelink communication may be supported. For actual transmission, a carrier may be initially selected or may be re-selected among aggregated carriers for V2X sidelink communication. There may be various ways for reselecting for sidelink transmission. However, there may be a need to detect a number of retransmissions unacknowledged on the selected carrier for carrier (re-)selection.

In an aspect, a method performed by a wireless device in a wireless communication system is provided. The method may include selecting a first carrier upon which the wireless device performs first sidelink transmission based on the first carrier to a target wireless device. The method may include detecting a number of retransmissions unacknowledged on the first carrier. The method may include performing second sidelink transmission to the target wireless device based on a second carrier different from the first carrier.

In another aspect, a wireless device in a wireless communication system is provided. The wireless device may include a memory, a transceiver, and a processor, operably coupled to the memory and the transceiver. The processor may be configured to select a first carrier upon which the wireless device performs first sidelink transmission based on the first carrier to a target wireless device. The processor may be configured to detect a number of retransmissions unacknowledged on the first carrier. The processor may be configured to control the transceiver to perform second sidelink transmission to the target wireless device based on a second carrier different from the first carrier.

In another aspect, a processor of a wireless device in a wireless communication system is provided. The processor may be configured to select a first carrier upon which the wireless device performs first sidelink transmission based on the first carrier to a target wireless device. The processor may be configured detect a number of retransmissions unacknowledged on the first carrier. The processor may be configured control the wireless device to perform second sidelink transmission to the target wireless device based on a second carrier different from the first carrier.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
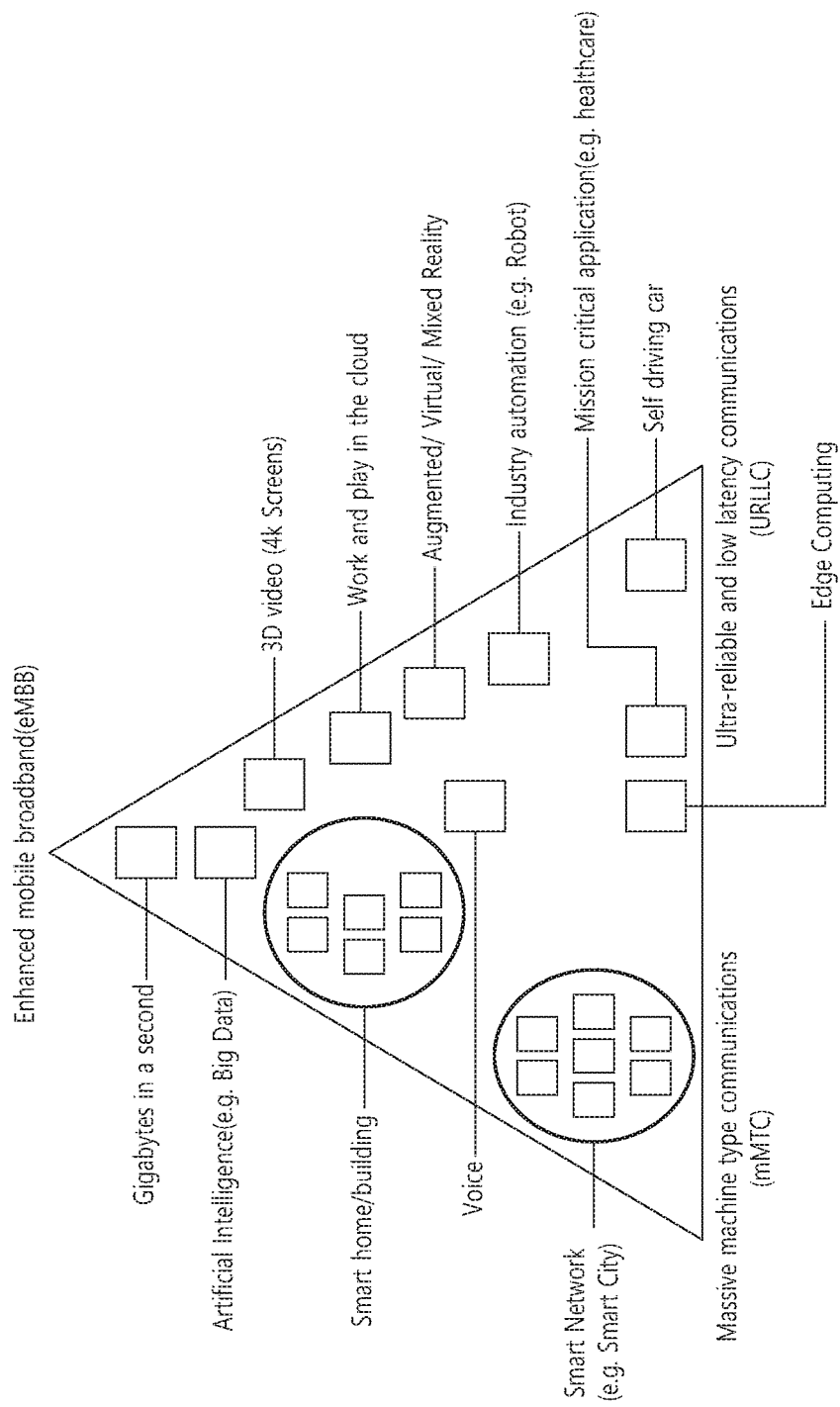
FIG. 1 shows examples of 5G usage scenarios to which the technical features of the present disclosure can be applied.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture, and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
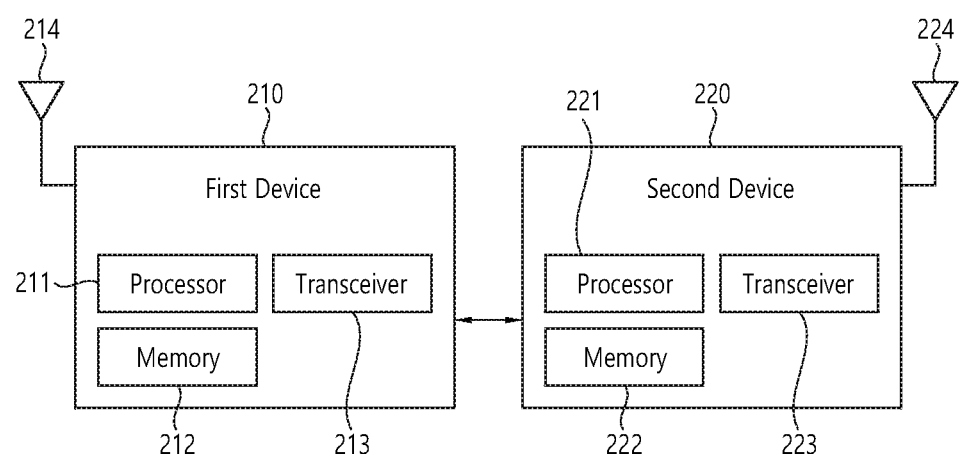
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body.

For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
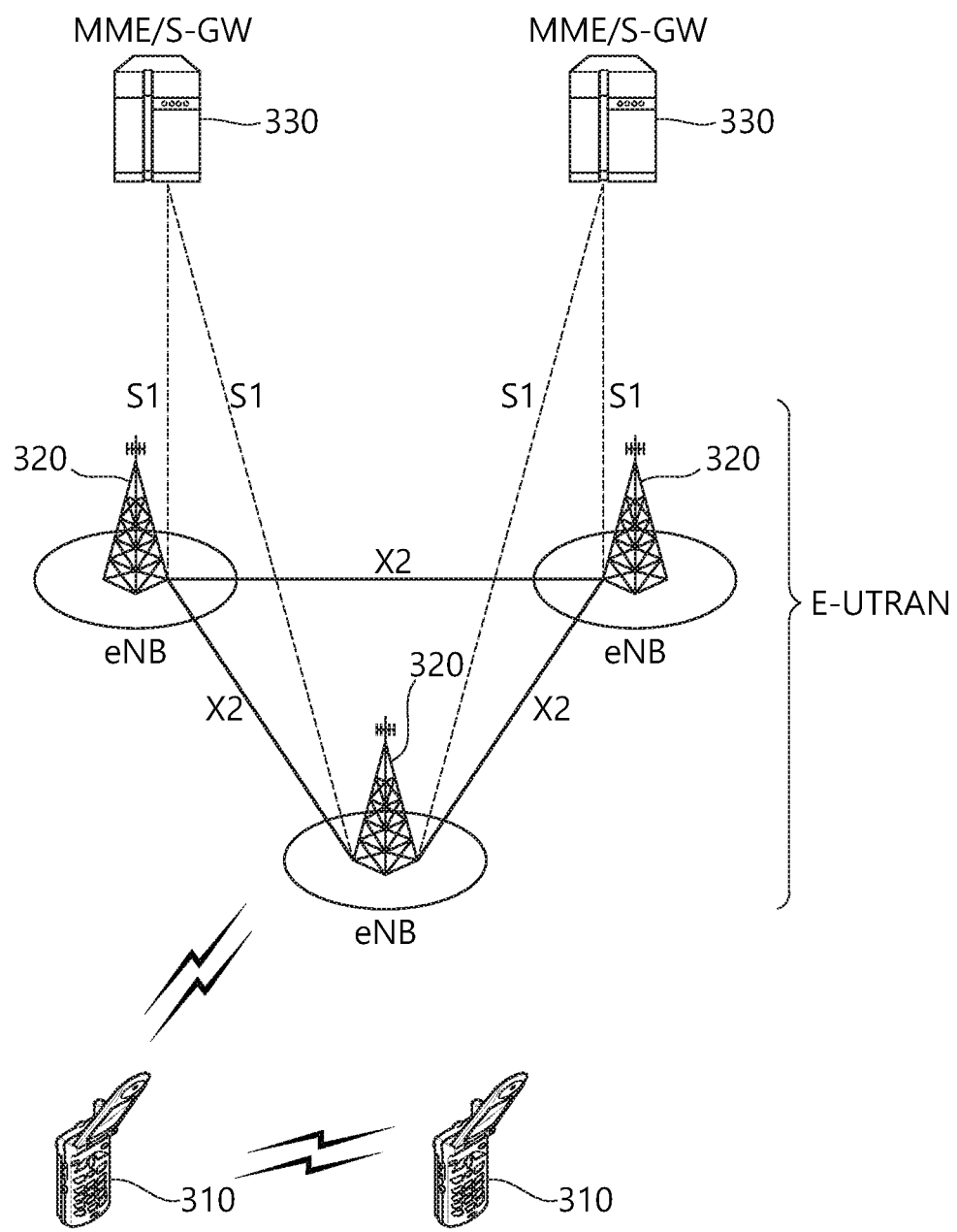
FIG. 3 shows another example of a wireless communication system to which the technical features of the present disclosure can be applied.

FIG. 3 shows another example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), and a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
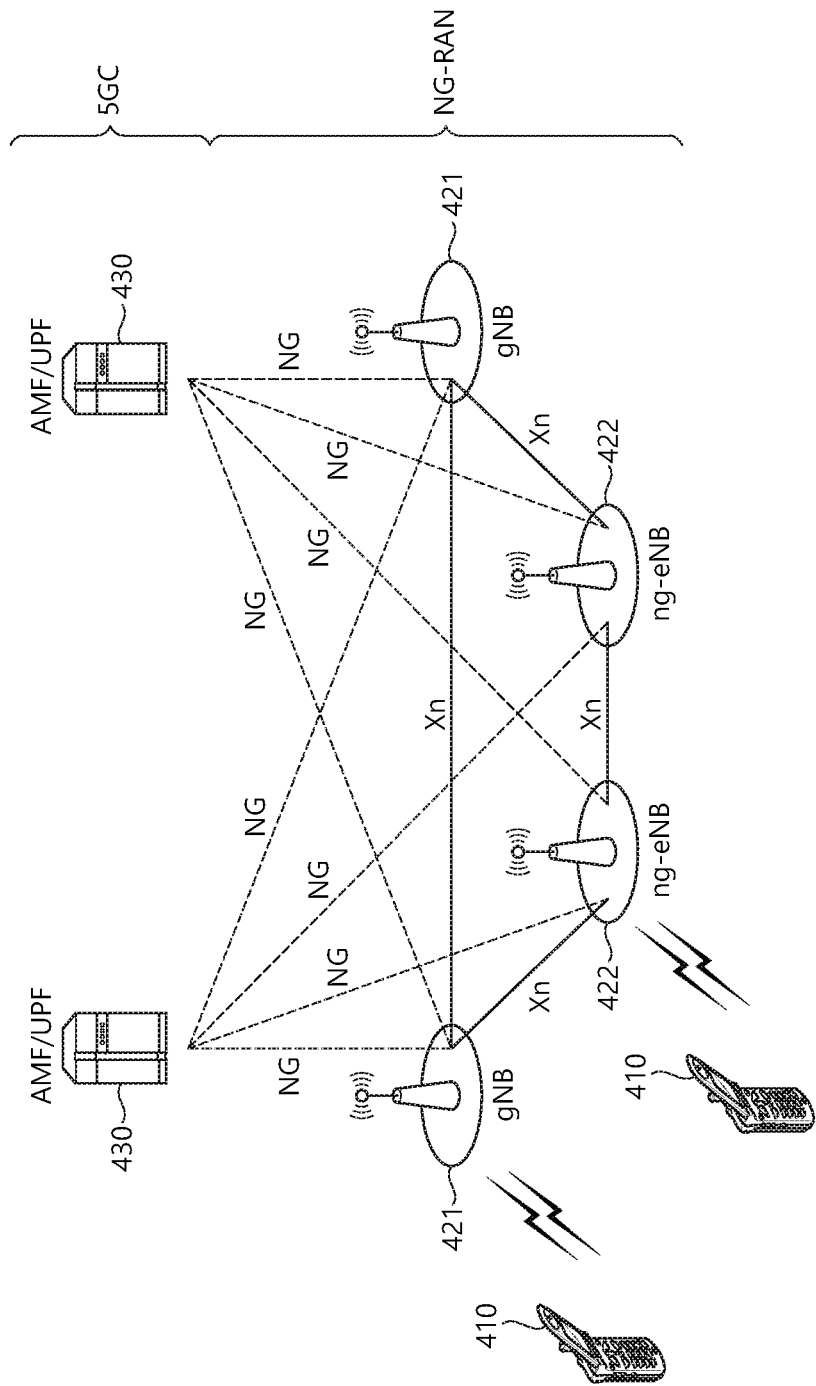
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional 5-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
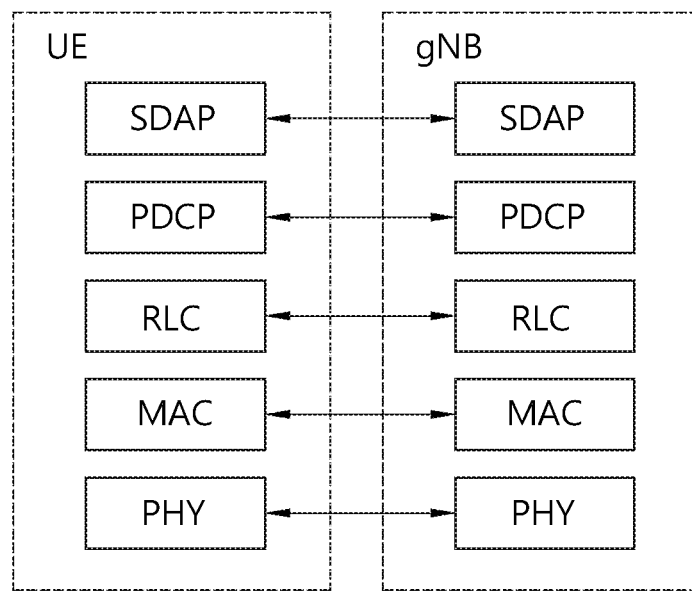
FIG. 5 shows a block diagram of a user plane protocol stack to which the technical features of the present disclosure can be applied.
Figure 6:
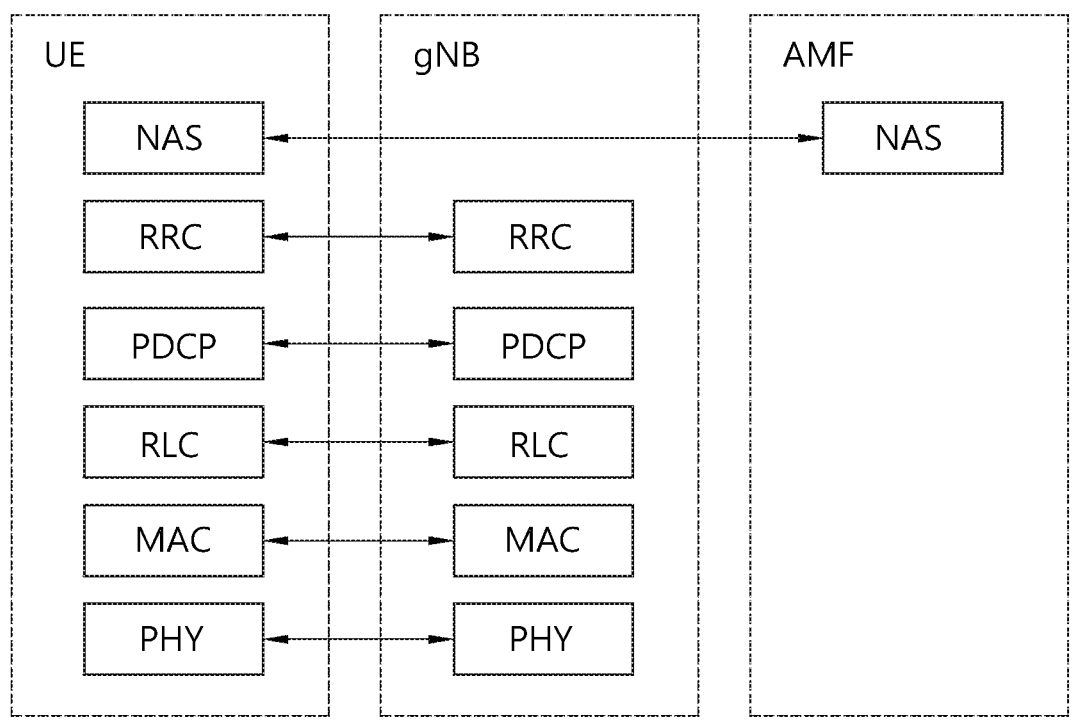
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Sidelink communication is described. It may be referred to as Section 23.10 of 3GPP TS 36.300 V15.4.0 (2019-01). Sidelink is a UE to UE interface for sidelink communication, vehicle-to-everything (V2X) sidelink communication and sidelink discovery. The Sidelink corresponds to the PC5 interface. Sidelink transmissions are defined for sidelink discovery, sidelink communication and V2X sidelink communication between UEs. The sidelink transmissions use the same frame structure as the frame structure that is defined for UL and DL when UEs are in network coverage. However, the sidelink transmission are restricted to a sub-set of the UL resources in time and frequency domain. Various physical channels, transport channels and logical channels may be defined for sidelink transmission.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication. The terminology "sidelink communication" without "V2X" prefix may only concern public safety unless specifically stated otherwise.

In order to perform synchronization for out of coverage operation, UE(s) may act as a synchronization source by transmitting sidelink broadcast control channel (SBCCH) and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signaled by the BS. When the UE is out of coverage, if the UE selects another UE as a synchronization reference, then the content of SBCCH is derived from the received SBCCH. Otherwise UE uses pre-configured parameters. SIB 18 provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs sidelink communication on subframes defined over the duration of sidelink control (SC) period. The SC period is the period over which resources allocated in a cell for sidelink control information (SCI) and sidelink data transmissions occur. Within the SC period, the UE sends SCI followed by sidelink data. SCI indicates a Layer 1 ID and characteristics of the transmissions (e.g. modulation and coding scheme (MCS), location of the resource(s) over the duration of SC period, timing alignment).

The UE performs transmission and reception over Uu and PC5 with the following decreasing priority order in case sidelink discovery gap is not configured:
  Uu transmission/reception (highest priority);
  PC5 sidelink communication transmission/reception;
  PC5 sidelink discovery announcement/monitoring (lowest priority).

The UE performs transmission and reception over Uu and PC5 with the following decreasing priority order in case sidelink discovery gap is configured:
  Uu transmission/reception for RACH;
  PC5 sidelink discovery announcement during a sidelink discovery gap for transmission;
  Non-RACH Uu transmission;
  PC5 sidelink discovery monitoring during a sidelink discovery gap for reception;
  Non-RACH Uu reception;
  PC5 sidelink communication transmission/reception.

The UE supporting sidelink communication can operate in two modes for resource allocation. The first mode is a scheduled resource allocation, which may be referred to as "Mode 1" for resource allocation of sidelink communication. In the Mode 1, the UE needs to be RRC_CONNECTED in order to transmit data. The UE requests transmission resources from the BS. The BS schedules transmission resources for transmission of sidelink control information and sidelink data. The UE sends a scheduling request (dedicated scheduling request (D-SR) or random access) to the BS followed by a sidelink buffer status report (BSR). Based on the sidelink BSR, the BS can determine that the UE has data for a sidelink communication transmission and estimate the resources needed for transmission. The BS can schedule transmission resources for sidelink communication using configured sidelink radio network temporary identity (SL-RNTI).

The second mode is a UE autonomous resource selection, which may be referred to as "Mode 2" for resource allocation of sidelink communication. In the Mode 2, a UE on its own selects resources from resource pools and performs transport format selection to transmit sidelink control information and data. There can be up to 8 transmission pools either pre-configured for out of coverage operation or provided by RRC signaling for in-coverage operation. Each pool can have one or more ProSe per-packet priority (PPPP) associated with it. For transmission of a MAC PDU, the UE selects a transmission pool in which one of the associated PPPP is equal to the PPPP of a logical channel with highest PPPP among the logical channel identified in the MAC PDU. It is up to UE implementation how the UE selects amongst multiple pools with same associated PPPP. There is a one to one association between sidelink control pool and sidelink data pool. Once the resource pool is selected, the selection is valid for the entire SC period. After the SC period is finished, the UE may perform resource pool selection again. The UE is allowed to perform multiple transmissions to different destinations in a single SC period.

A UE in RRC_CONNECTED may send a sidelink UE information message to BS when UE becomes interested in sidelink communication. In response, BS may configure the UE with a SL-RNTI.

Herein after V2X sidelink communication will be described. It may be referred to as Section 23.14 of 3GPP TS 36.300 V15.4.0 (2019-01).

Vehicular communication services, represented by V2X services, can consist of the following four different types: V2V, V2I, V2N and V2P.

V2X services can be provided by PC5 interface and/or Uu interface. Support of V2X services via PC5 interface is provided by V2X sidelink communication, which is a mode of communication whereby UEs can communicate with each other directly over the PC5 interface. This communication mode is supported when the UE is served by E-UTRAN and when the UE is outside of E-UTRA coverage. Only the UEs authorized to be used for V2X services can perform V2X sidelink communication.

The user plane protocol stack and functions, as specified above for sidelink communication, are also used for V2X sidelink communication. In addition, for V2X sidelink communication:
  STCH for sidelink communication is also used for V2X sidelink communication.
  Non-V2X (e.g. Public Safety) data is not multiplexed with V2X data transmitted in resources configured for V2X sidelink communication.
  The Access Stratum (AS) is provided with the PPPP and PPPR of a protocol data unit transmitted over PC5 interface by upper layers. The packet delay budget (PDB) of the protocol data unit can be determined from the PPPP. The low PDB is mapped to the high priority PPPP value.
  The Access Stratum (AS) is provided with a transmit profile of a protocol data unit transmitted over PC5 interface by upper layers.
  The logical channel prioritization based on PPPP is used for V2X sidelink communication.

Control plane protocol stack for SBCCH for sidelink communication is also used for V2X sidelink communication.

The UE supporting V2X sidelink communication can operate in two modes for resource allocation:
  Scheduled resource allocation, characterized by:
    The UE needs to be RRC_CONNECTED in order to transmit data;
    The UE requests transmission resources from the eNB. The eNB schedules transmission resources for transmission of sidelink control information and data. Sidelink SPS is supported for scheduled resource allocation;
  UE autonomous resource selection, characterized by:
    The UE on its own selects resources from resource pools and performs transport format selection to transmit sidelink control information and data;
    If mapping between the zones and V2X sidelink transmission resource pools is configured, the UE selects V2X sidelink resource pool based on the zone UE is located in.
    The UE performs sensing for (re)selection of sidelink resources. Based on sensing results, the UE (re)selects some specific sidelink resources and reserves multiple sidelink resources. Up to 2 parallel independent resource reservation processes are allowed to be performed by the UE. The UE is also allowed to perform a single resource selection for its V2X sidelink transmission.

For V2X sidelink transmission, during handover, transmission resource pool configurations including exceptional transmission resource pool for the target cell can be signaled in the handover command to reduce the transmission interruption. In this way, the UE may use the V2X sidelink transmission resource pools of the target cell before the handover is completed as long as either synchronization is performed with the target cell in case eNB is configured as synchronization source or synchronization is performed with GNSS in case GNSS is configured as synchronization source. If the exceptional transmission resource pool is included in the handover command, the UE uses randomly selected resources from the exceptional transmission resource pool, starting from the reception of handover command. If the UE is configured with scheduled resource allocation in the handover command, the UE continues to use the exceptional transmission resource pool while the timer associated with handover is running. If the UE is configured with autonomous resource selection in the target cell the UE continues to use the exceptional transmission resource pool until the sensing results on the transmission resource pools for autonomous resource selection are available. For exceptional cases (e.g. during RLF, during transition from RRC IDLE to RRC CONNECTED or during change of dedicated V2X sidelink resource pools within a cell), the UE may select resources in the exceptional pool provided in serving cell's SIB21 or in dedicated signalling based on random selection, and uses them temporarily. During cell reselection, the RRC_IDLE UE may use the randomly selected resources from the exceptional transmission resource pool of the reselected cell until the sensing results on the transmission resource pools for autonomous resource selection are available.

SL-SCH Data transmission is described. It may be referred to as Section 5.14 of 3GPP TS 36.321 V15.3.0 (2018-10). In order to transmit on the SL-SCH the MAC entity may have at least one sidelink grant.

In order to transmit on the SL-SCH the MAC entity must have at least one sidelink grant.

Sidelink grants are selected as follows for sidelink communication:
if the MAC entity is configured to receive a single sidelink grant dynamically on the PDCCH and more data is available in STCH than can be transmitted in the current SC period, the MAC entity shall:
using the received sidelink grant determine the set of subframes in which transmission of SCI and transmission of first transport block occur;
consider the received sidelink grant to be a configured sidelink grant occurring in those subframes starting at the beginning of the first available SC Period which starts at least 4 subframes after the subframe in which the sidelink grant was received, overwriting a previously configured sidelink grant occurring in the same SC period, if available;
clear the configured sidelink grant at the end of the corresponding SC Period;
else, if the MAC entity is configured by upper layers to receive multiple sidelink grants dynamically on the PDCCH and more data is available in STCH than can be transmitted in the current SC period, the MAC entity shall for each received sidelink grant:
using the received sidelink grant determine the set of subframes in which transmission of SCI and transmission of first transport block occur;
consider the received sidelink grant to be a configured sidelink grant occurring in those subframes starting at the beginning of the first available SC Period which starts at least 4 subframes after the subframe in which the sidelink grant was received, overwriting a previously configured sidelink grant received in the same subframe number but in a different radio frame as this configured sidelink grant occurring in the same SC period, if available;
clear the configured sidelink grant at the end of the corresponding SC Period;
else, if the MAC entity is configured by upper layers to transmit using one or multiple pool(s) of resources as indicated in subclause 5.10.4 of [8] and more data is available in STCH than can be transmitted in the current SC period, the MAC entity shall for each sidelink grant to be selected:
if configured by upper layers to use a single pool of resources:
select that pool of resources for use;
else, if configured by upper layers to use multiple pools of resources:
select a pool of resources for use from the pools of resources configured by upper layers whose associated priority list includes the priority of the highest priority of the sidelink logical channel in the MAC PDU to be transmitted;
NOTE: If more than one pool of resources has an associated priority list which includes the priority of the sidelink logical channel with the highest priority in the MAC PDU to be transmitted, it is left for UE implementation which one of those pools of resources to select.
randomly select the time and frequency resources for SL-SCH and SCI of a sidelink grant from the selected resource pool. The random function shall be such that each of the allowed selections [2] can be chosen with equal probability;
use the selected sidelink grant to determine the set of subframes in which transmission of SCI and transmission of first transport block;
consider the selected sidelink grant to be a configured sidelink grant occurring in those subframes starting at the beginning of the first available SC Period which starts at least 4 subframes after the subframe in which the sidelink grant was selected;
clear the configured sidelink grant at the end of the corresponding SC Period;
NOTE: Retransmissions on SL-SCH cannot occur after the configured sidelink grant has been cleared.
NOTE: If the MAC entity is configured by upper layers to transmit using one or multiple pool(s) of resources as indicated in subclause 5.10.4 of [8], it is left for UE implementation how many sidelink grants to select within one SC period taking the number of sidelink processes into account.

Sidelink grants are selected as follows for V2X sidelink communication:
if the MAC entity is configured to receive a sidelink grant dynamically on the PDCCH and data is available in STCH, the MAC entity shall:
use the received sidelink grant to determine the number of HARQ retransmissions and the set of subframes in which transmission of SCI and SL-SCH occur;

consider the received sidelink grant to be a configured sidelink grant;
if the MAC entity is configured by upper layers to receive a sidelink grant on the PDCCH addressed to SL Semi-Persistent Scheduling V-RNTI, the MAC entity shall for each SL SPS configuration:
if PDCCH contents indicate SPS activation:
use the received sidelink grant to determine the number of HARQ retransmissions and the set of subframes in which transmission of SCI and SL-SCH occur;
consider the received sidelink grant to be a configured sidelink grant;
if PDCCH contents indicate SPS release:
clear the corresponding configured sidelink grant;
if the MAC entity is configured by upper layers to transmit using pool(s) of resources in one or multiple carriers based on sensing, or partial sensing, or random selection only if upper layers indicates that transmissions of multiple MAC PDUs are allowed, and the MAC entity selects to create a configured sidelink grant corresponding to transmissions of multiple MAC PDUs, and data is available in STCH associated with one or multiple carriers, the MAC entity shall for each Sidelink process configured for multiple transmissions on a selected carrier:
if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep; or
if neither transmission nor retransmission has been performed by the MAC entity on any resource indicated in the configured sidelink grant during the last second; or
if sl-ReselectAfter is configured and the number of consecutive unused transmission opportunities on resources indicated in the configured sidelink grant is equal to sl-ReselectAfter; or
if there is no configured sidelink grant; or
if the configured sidelink grant cannot accommodate a RLC SDU by using the maximum allowed MCS configured by upper layers in maxMCS-PSSCH and the MAC entity selects not to segment the RLC SDU; or
NOTE: If the configured sidelink grant cannot accommodate the RLC SDU, it is left for UE implementation whether to perform segmentation or sidelink resource reselection.
if transmission(s) with the configured sidelink grant cannot fulfil the latency requirement of the data in a sidelink logical channel according to the associated PPPP, and the MAC entity selects not to perform transmission(s) corresponding to a single MAC PDU; or
NOTE: If the latency requirement is not met, it is left for UE implementation whether to perform transmission(s) corresponding to single MAC PDU or sidelink resource reselection.
if a pool of resources is configured or reconfigured by upper layers for the selected carrier:
clear the configured sidelink grant, if available;
trigger the TX carrier (re-)selection procedure;
if the carrier is (re-)selected in the Tx carrier (re-)selection, the following is performed on the selected carrier:
select one of the allowed values configured by upper layers in restrictResourceReservationPeriod and set the resource reservation interval by multiplying 100 with the selected value;

NOTE: How the UE selects this value is up to UE implementation.
randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;
select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;
select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;
if transmission based on random selection is configured by upper layers:
randomly select the time and frequency resources for one transmission opportunity from the resource pool, according to the amount of selected frequency resources. The random function shall be such that each of the allowed selections can be chosen with equal probability;
else:
randomly select the time and frequency resources for one transmission opportunity from the resources indicated by the physical layer according to subclause 14.1.1.6 of [2], according to the amount of selected frequency resources. The random function shall be such that each of the allowed selections can be chosen with equal probability;
use the randomly selected resource to select a set of periodic resources spaced by the resource reservation interval for transmission opportunities of SCI and SL-SCH corresponding to the number of transmission opportunities of MAC PDUs;
if the number of HARQ retransmissions is equal to 1 and there are available resources left in the resources indicated by the physical layer that meet the conditions for more transmission opportunities:
randomly select the time and frequency resources for one transmission opportunity from the available resources, according to the amount of selected frequency resources. The random function shall be such that each of the allowed selections can be chosen with equal probability;
use the randomly selected resource to select a set of periodic resources spaced by the resource reservation interval for the other transmission opportunities of SCI and SL-SCH corresponding to the number of retransmission opportunities of the MAC PDUs;

consider the first set of transmission opportunities as the new transmission opportunities and the other set of transmission opportunities as the retransmission opportunities;

consider the set of new transmission opportunities and retransmission opportunities as the selected sidelink grant.

else:

consider the set as the selected sidelink grant;

use the selected sidelink grant to determine the set of subframes in which transmissions of SCI and SL-SCH occur;

consider the selected sidelink grant to be a configured sidelink grant;

else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by upper layers in probResourceKeep:

clear the configured sidelink grant, if available;

randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

use the previously selected sidelink grant for the number of transmissions of the MAC PDUs with the resource reservation interval to determine the set of subframes in which transmissions of SCI and SL-SCH occur;

consider the selected sidelink grant to be a configured sidelink grant;

else, if the MAC entity is configured by upper layers to transmit using pool(s) of resources in one or multiple carriers, the MAC entity selects to create a configured sidelink grant corresponding to transmission(s) of a single MAC PDU, and data is available in STCH associated with one or multiple carriers, the MAC entity shall for a Sidelink process on a selected carrier:

trigger the TX carrier (re-)selection procedure;

if the carrier is (re-)selected in the Tx carrier (re-)selection, the following is performed on the selected carrier:

select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;

select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;

if transmission based on random selection is configured by upper layers:

randomly select the time and frequency resources for one transmission opportunity of SCI and SL-SCH from the resource pool, according to the amount of selected frequency resources. The random function shall be such that each of the allowed selections can be chosen with equal probability;

else:

randomly select the time and frequency resources for one transmission opportunity of SCI and SL-SCH from the resources indicated by the physical layer, according to the amount of selected frequency resources. The random function shall be such that each of the allowed selections can be chosen with equal probability;

if the number of HARQ retransmissions is equal to 1:

if transmission based on random selection is configured by upper layers and there are available resources that meet the conditions for one more transmission opportunity:

randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;

else, if transmission based on sensing or partial sensing is configured by upper layers and there are available resources left in the resources indicated by the physical layer that meet the conditions for one more transmission opportunity:

randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;

consider a transmission opportunity which comes first in time as the new transmission opportunity and a transmission opportunity which comes later in time as the retransmission opportunity;

consider both of the transmission opportunities as the selected sidelink grant;

else:

consider the transmission opportunity as the selected sidelink grant;

use the selected sidelink grant to determine the subframes in which transmission(s) of SCI and SL-SCH occur;

consider the selected sidelink grant to be a configured sidelink grant.

NOTE: For V2X sidelink communication, the UE should ensure the randomly selected time and frequency resources fulfill the latency requirement.

NOTE: For V2X sidelink communication, when there is no overlapping between the chosen configuration(s) in pssch-TxConfigList and chosen configuration(s) indicated in cbr-pssch-TxConfigList, it is up to UE implementation whether the UE transmits and which transmitting parameters the UE uses between allowed configuration(s) indicated in pssch-TxConfigList and allowed configuration(s) indicated in cbr-pssch-TxConfigList.

The MAC entity shall for each subframe:
if the MAC entity has a configured sidelink grant occurring in this subframe:
  if SL_RESOURCE_RESELECTION_COUNTER=1 and the MAC entity randomly selected, with equal probability, a value in the interval [0, 1] which is above the probability configured by upper layers in probResourceKeep:
    set the resource reservation interval equal to 0;
  if the configured sidelink grant corresponds to transmission of SCI:
    for V2X sidelink communication in UE autonomous resource selection:
      select a MCS which is, if configured, within the range that is configured by upper layers between minMCS-PSSCH and maxMCS-PSSCH included in pssch-TxConfigList and, if configured by upper layers, overlapped between minMCS-PSSCH and maxMCS-PSSCH indicated in cbr-pssch-TxConfigList for the highest priority of the sidelink logical channel(s) in the MAC PDU and the CBR measured by lower layers according to [6] if CBR measurement results are available or the corresponding defaultTxConfigIndex configured by upper layers if CBR measurement results are not available;
  NOTE: MCS selection is up to UE implementation if the MCS or the corresponding range is not configured by upper layers.
  NOTE: For V2X sidelink communication, when there is no overlapping between the chosen configuration(s) included in pssch-TxConfigList and chosen configuration(s) indicated in cbr-pssch-TxConfigList, it is up to UE implementation whether the UE transmits and which transmitting parameters the UE uses between allowed configuration(s) indicated in pssch-TxConfigList and allowed configuration(s) indicated in cbr-pssch-TxConfigList.
    for V2X sidelink communication in scheduled resource allocation:
      select a MCS unless it is configured by upper layer;
    instruct the physical layer to transmit SCI corresponding to the configured sidelink grant;
    for V2X sidelink communication, deliver the configured sidelink grant, the associated HARQ information and the value of the highest priority of the sidelink logical channel(s) in the MAC PDU to the Sidelink HARQ Entity for this subframe;
  else if the configured sidelink grant corresponds to transmission of first transport block for sidelink communication:
    deliver the configured sidelink grant and the associated HARQ information to the Sidelink HARQ Entity for this subframe.
  NOTE: If the MAC entity has multiple configured grants occurring in one subframe and if not all of them can be processed due to the single-cluster SC-FDM restriction, it is left for UE implementation which one of these to process according to the procedure above.

Hereinafter, sidelink HARQ operation will be described. It may be referred to as Section 5.14.1.2 of 3GPP TS 36.321 V15.3.0 (2018-10). The MAC entity may be configured by upper layers to transmit using pool(s) of resources on one or multiple carriers. There may be one Sidelink HARQ Entity at the MAC entity for each carrier for transmission on SL-SCH, which maintains a number of parallel Sidelink processes. For sidelink communication, the number of transmitting Sidelink processes associated with the Sidelink HARQ Entity may be pre-defined. According to some embodiments of the present disclosure, for V2X sidelink communication, the maximum number of transmitting Sidelink processes associated with each Sidelink HARQ Entity may be 8. A sidelink process may be configured for transmissions of multiple MAC PDUs. According to some embodiments of the present disclosure, for transmissions of multiple MAC PDUs, the maximum number of transmitting Sidelink processes associated with each Sidelink HARQ Entity may be 2. However, the present disclosure is not limited thereto.

The Sidelink process may be associated with a HARQ buffer. The sequence of redundancy versions may be 0, 2, 3, and 1. The variable CURRENT_IRV may be an index into the sequence of redundancy versions. This variable may be updated modulo 4. New transmissions and retransmissions either for a given SC period in sidelink communication or in V2X sidelink communication may be performed on the resource indicated in the sidelink grant and with the MCS.

Hereinafter, TX carrier (re-)selection for V2X sidelink communication will be described. It may be referred to as Section 5.14.1.5 of 3GPP TS 36.321 V15.3.0 (2018-9).

The MAC entity shall consider a CBR of a carrier to be one measured by lower layers according to 3GPP TS 36.214 [6] if CBR measurement results are available, or the corresponding defaultTxConfigIndex configured by upper layers for the carrier if CBR measurement results are not available.

The MAC entity shall:
if the MAC entity is configured by upper layers to transmit using pool(s) of resources on one or multiple carriers and data is available in STCH (i.e. initial Tx carrier selection):
  for each sidelink logical channel where data is available:
    for each carrier configured by upper layers (3GPP TS 24.386 [15]) associated with the concerned sidelink logical channel:
      if the CBR of the carrier is below threshCBR-FreqReselection associated with the priority of the sidelink logical channel:
        consider the carrier as a candidate carrier for TX carrier (re-)selection for the concerned sidelink logical channel
else if the MAC entity has been configured by upper layers to transmit using pool(s) of resources on one or multiple carriers, and the TX carrier reselection is triggered for a process associated with a carrier:
  for each sidelink logical channel allowed on the carrier where data is available and Tx carrier (re-)selection is triggered:
    if the CBR of the carrier is below threshCBR-FreqKeeping associated with priority of sidelink logical channel:
      select the carrier and the associated pool of resources.
    else:
      for each carrier configured by upper layers, if the CBR of the carrier is below threshCBR-FreqReselection associated with the priority of the sidelink logical channel;
        consider the carrier as a candidate carrier for TX carrier (re-)selection.

The MAC entity shall:
if one or more carriers are considered as the candidate carriers for TX carrier (re-)selection:
for each sidelink logical channel allowed on the carrier where data is available and Tx carrier (re-)selection is triggered, select one or more carrier(s) and associated pool(s) of resources among the candidate carriers with increasing order of CBR from the lowest CBR;

NOTE 1: It is left to UE implementation how many carriers to select based on UE capability.

NOTE 2: It is left to UE implementation to determine the sidelink logical channels for which Tx carrier (re-) selection is triggered among the sidelink logical channels allowed on the carrier.

NOTE 3: If the MAC entity is configured by the upper layer to receive a sidelink grant dynamically on the PDCCH, it is left to UE implementation to determine which carriers configured by upper layer in sl-V2X-ConfigDedicated [8] are considered as selected carriers.

Hereinafter, Logical channel prioritization will be described. It may be referred to as Section 5.14.1.5 of 3GPP TS 36.321 V15.3.0 (2018-9).

The Logical Channel Prioritization procedure is applied when a new transmission is performed. Each sidelink logical channel has an associated priority which is the PPPP and optionally an associated PPPR. Multiple sidelink logical channels may have the same associated priority. The mapping between priority and LCID is left for UE implementation. If duplication is activated, the MAC entity shall map different sidelink logical channels which correspond to the same PDCP entity in duplication onto different carriers or onto different carriers of different carrier set, if configured by upper layer, based on UE implementation.

The MAC entity shall perform the following Logical Channel Prioritization procedure either for each SCI transmitted in an SC period in sidelink communication, or for each SCI corresponding to a new transmission in V2X sidelink communication:

The MAC entity shall allocate resources to the sidelink logical channels in the following steps:
Only consider sidelink logical channels not previously selected for this SC period and the SC periods (if any) which are overlapping with this SC period, to have data available for transmission in sidelink communication;
Only consider sidelink logical channels which meet the following conditions:
allowed on the carrier where the SCI is transmitted for V2X sidelink communication, if the carrier is configured by upper layers;
having a priority whose associated threshCBR-FreqReselection is no lower than the CBR of the carrier when the carrier is (re-)selected;
Exclude sidelink logical channel(s) not allowed on the carrier where the SCI is transmitted, if duplication is activated.
Step 0: Select a ProSe Destination, having the sidelink logical channel with the highest priority, among the sidelink logical channels having data available for transmission and having the same transmission format as the one selected corresponding to the ProSe Destination;

NOTE: The sidelink logical channels belonging to the same ProSe Destination have the same transmission format.

For each MAC PDU associated to the SCI:
Step 1: Among the sidelink logical channels belonging to the selected ProSe Destination and having data available for transmission, allocate resources to the sidelink logical channel with the highest priority;
Step 2: if any resources remain, sidelink logical channels belonging to the selected ProSe Destination are served in decreasing order of priority until either the data for the sidelink logical channel(s) or the SL grant is exhausted, whichever comes first. Sidelink logical channels configured with equal priority should be served equally.

The UE shall also follow the rules below during the scheduling procedures above:
the UE should not segment an RLC SDU (or partially transmitted SDU) if the whole SDU (or partially transmitted SDU) fits into the remaining resources;
if the UE segments an RLC SDU from the sidelink logical channel, it shall maximize the size of the segment to fill the grant as much as possible;
the UE should maximise the transmission of data;
if the MAC entity is given a sidelink grant size that is equal to or larger than 10 bytes (for sidelink communication) or 11 bytes (for V2X sidelink communication) while having data available for transmission, the MAC entity shall not transmit only padding.

The UE supporting V2X sidelink communication can operate in two modes for resource allocation. The first mode is a scheduled resource allocation, which may be referred to as "Mode 3" for resource allocation of V2X sidelink communication. In the Mode 3, the UE needs to be RRC_CONNECTED in order to transmit data. The UE requests transmission resources from the BS. The BS schedules transmission resources for transmission of sidelink control information and data. Sidelink semi-persistent scheduling (SPS) is supported for the Mode 3.

The second mode is a UE autonomous resource selection, which may be referred to as "Mode 4" for resource allocation of V2X sidelink communication. In the Mode 4, the UE on its own selects resources from resource pools and performs transport format selection to transmit sidelink control information and data. If mapping between the zones and V2X sidelink transmission resource pools is configured, the UE selects V2X sidelink resource pool based on the zone UE is located in. The UE performs sensing for (re)selection of sidelink resources. Based on sensing results, the UE (re) selects some specific sidelink resources and reserves multiple sidelink resources. Up to 2 parallel independent resource reservation processes are allowed to be performed by the UE. The UE is also allowed to perform a single resource selection for its V2X sidelink transmission.

Mode 4 may be characterized by:
The UE on its own selects resources from resource pools and performs transport format selection to transmit sidelink control information and data;
If mapping between the zones and V2X sidelink transmission resource pools is configured, the UE selects V2X sidelink resource pool based on the zone UE is located in;
The UE performs sensing for (re)selection of sidelink resources. Based on sensing results, the UE (re)selects some specific sidelink resources and reserves multiple sidelink resources. Up to 2 parallel independent resource reservation processes are allowed to be performed by the UE. The UE is also allowed to perform a single resource selection for its V2X sidelink transmission.

In V2X, one UE can establish a PC5 link (a.k.a. one-to-one connection or session between UEs) for unicast service with another UE and Tight QoS requirement is introduced.

Exchange of PC5 signaling would be vulnerable to transmission loss sometimes, so that PC5 packets may be failed. Such failure of packets over PC5 will result in service delay, interruption or blockage which could be critical to vehicular UEs using road safety services.

A method for selecting and reselecting Transmission (TX) carrier for a sidelink communication is may be introduced for efficient V2X communication. Hereinafter, various aspects of the present disclosure are described.

According to some embodiments of the present disclosure, a method for an UE performing sidelink communication includes the following steps:

Step 1: The UE may initiate to perform sidelink communication with target UE. TX carrier (re) selection for V2X sidelink communication is triggered in each UE. The sidelink communication may include at least one of unicast, groupcast or broadcast manner.

Step 2: Selected carrier(s) for sidelink communication may be determined by one of UEs (i.e. initiating UE or target UE) involving sidelink communication, or by each UE.

If one of UEs involving sidelink communication determines selected carrier(s), the determining UE may be (pre)configured by network or other UE involving the sidelink communication. Or, the determining UE may be determined by negotiation between UEs and the determining UE may inform the selected carrier(s) of other UEs involving the sidelink communication.

If each UE determines selected carrier(s), each UE(s) needs to exchange the selected carrier(s) to determine final selected carrier(s) (e.g. for negotiation).

The selected carriers may be determined during setup procedure for sidelink communication.

Final selected carrier(s) may be used for the sidelink communication. Other selected carrier(s) may be stored in each UE for the case the final selected carrier(s) will not be available (e.g., because the maximum number of HARQ retransmissions has been reached on any resource of the final selected carrier).

The stored selected carrier may be updated by re-evaluation via TX carrier (re)selection procedure. The TX carrier (re)selection procedure may be performed with recent information for carrier(s) which can be shared by measurement or feedback signaling between UEs. Information for the stored selected carrier(s) may be synchronized between UEs. The re-evaluation may be triggered either periodically or by event based. The event based (re)evaluation may be triggered if signaling strength or quality (i.e. RSRP or RSRQ) is lower than the threshold and/or the number of selected carrier(s) satisfying signaling strength or quality is less than the pre-determined value.

Step 3. The UE may perform sidelink communication via (final) selected carrier(s).

Step 4: If the UE detects the maximum number of HARQ retransmissions has been reached on any resource indicated in the configured sidelink grant associated with sidelink process, the UE may perform the followings:

The UE performs TX carrier (re)selection procedure for the sidelink process, and The UE sends sidelink message to UEs performing the sidelink communication using carrier(s) associated to the sidelink process.

The sidelink message may include information on that the maximum number of HARQ retransmissions has been reached in the UE and associated sidelink process index and/or carrier index and/or logical channel IDs where the maximum number of HARQ retransmissions has been reached.

Upon receiving the sidelink message, the UE performs TX carrier (re)selection

According to some embodiments of the present disclosure, carrier(s) on which the maximum number of HARQ retransmissions has been reached (i.e. associated to the sidelink process) may not be considered as candidate carrier(s) for Tx carrier (re)selection procedure. For the Tx carrier (re)selection procedure, the stored selected carrier(s) may be used and considered as candidate carrier(s). For selecting carrier(s), the UE performs procedures specified in Step 2.

According to some embodiments of the present disclosure, a UE which performs the Step 4 may be (pre)configured by network or other UE in the sidelink communication, or determined by negotiation between the UE and the other UE.

Hereinafter, a method for selecting and reselecting Transmission (TX) carrier for a sidelink communication, according to some embodiments of the present disclosure, is may be introduced for efficient V2X communication. The method for an UE performing sidelink communication includes the following steps:

Step 1: UE1 perform sidelink communication for unicast and/or groupcast with UE2. In the case of groupcast, UE1 can be one of group members. When the sidelink communication is initiated, Tx carrier (re)selection procedure is triggered in either all UEs involving the sidelink communication or one of the UEs. If one of the UEs triggers Tx carrier (re)selection, the UE may be configured and/or determined by the network or by exchanging signaling between UEs. In this example, it is assumed UE2 triggers Tx carrier (re)selection. UE1 provides information for signaling strength or quality (i.e. RSRP or RSRQ) of carriers associated to the sidelink communication with UE2. UE2 may provide which carrier's information the UE1 need to provide. Based on the information UE1 provide, UE2 performs Tx carrier (re)selection. UE2 provides final selected carriers to UE1. With the final selected carrier(s), sidelink communication between UE1 and UE2 is performed. Final selected carrier(s) is used for the sidelink communication. Other selected carrier(s) may be stored in each UE for the case the final selected carrier(s) will not be available (e.g., because the maximum number of HARQ retransmissions has been reached on any resource of the final selected carrier). UE2 also provides the other selected carrier(s) to UE1. UE1 and UE2 store the other selected carrier(s) and perform monitoring for RSRP or RSRQ of other selected carrier(s).

Sidelink resource allocation is described in detail. If UE1 is in RRC_CONNECTED and configured for gNB scheduled sidelink resource allocation, UE1 may transmit Sidelink UE Information including Traffic Pattern of Service, TX carriers and/or RX carriers mapped to Service, QoS information related to Service (e.g. 5QI, PPPP, PPPR, QCI value), and Destination related to Service After receiving Sidelink UE Information, gNB constructs Sidelink Configuration at least including one or more resource pools for Service and Sidelink BSR configuration. gNB signals the Sidelink Configuration to UE1 and then UE1 configures lower layers with Sidelink Configuration.

If a message becomes available in L2 buffer for sidelink transmission, UE1 triggers Scheduling Request (SR), so that UE1 transmits PUCCH resource. If PUCCH resource is not configured, UE1 performs random access procedure as the Scheduling Request. If an uplink grant is given at a result of the SR, UE1 transmits Sidelink Buffer Status Report (SL BSR) to gNB. The Sidelink Buffer Status Report indicates at least a Destination index, a LCG, and a buffer size corresponding to the destination.

After receiving the SL BSR, gNB transmits a sidelink grant to UE1 e.g. by sending Downlink Control Information (DCI) in PDCCH. The DCI includes an allocated sidelink resource. If UE1 receives the DCI, UE1 uses the sidelink grant for transmission to UE2. Alternatively, if UE1 is configured for UE autonomous scheduling of sidelink resource allocation regardless of RRC state, UE1 autonomously select or reselect sidelink resources to create a sidelink grant used for transmission to UE2.

Step 2: UE2 performs Tx carrier (re)selection procedure periodically or by event based. The event based (re) evaluation may be triggered if signaling strength or quality (i.e. RSRP or RSRQ) is lower than the threshold or the number of selected carrier(s) satisfying signaling strength and/or quality is less than the pre-determined value. Then, after Tx carrier (re)selection, UE2 provides final selected carrier(s) and the other selected carriers to UE1. Based on the final selected carriers, sidelink communication is performed (i.e. sidelink data/signaling is transmitted via the final selected carrier(s)). UE1 and UE2 store the other selected carrier(s) and perform monitoring for RSRP or RSRQ or CBR of other selected carrier(s).

Step 3. UE1 s detect the maximum number of HARQ retransmissions has been reached on any resource indicated in the configured sidelink grant associated with sidelink process. UE1 sends sidelink message to UE2 to request/trigger Tx carrier (re)selection. The sidelink message may include associated sidelink process index and/or carrier index and/or logical channel IDs where the maximum number of HARQ retransmissions has been reached. The sidelink message may include cause value that maximum number of HARQ retransmissions has been reached. The sidelink message may provide RSRP or RSRQ or CBR of carrier(s) associated sidelink communication between UE1 and UE2.

Step 4. Upon receiving the sidelink message, UE2 performs Tx carrier (re)selection procedure. During performing Tx carrier (re)selection procedure, carrier(s) on which the maximum number of HARQ retransmissions has been reached (i.e. associated to the sidelink process) may not be considered as candidate carrier(s) for Tx carrier (re)selection procedure.

According to some embodiments of the present disclosure, without the sidelink message from UE1, UE2 performs Tx carrier (re)selection procedure if UE2 detects the maximum number of HARQ retransmissions has been reached on any resource indicated in the configured sidelink grant associated with sidelink process.

During performing Tx carrier (re)selection procedure, carrier(s) on which the maximum number of HARQ retransmissions has been reached (i.e. associated to the sidelink process) may not be considered as candidate carrier(s) for Tx carrier (re)selection procedure. During Tx carrier (re)selection procedure, UE2 may consider the stored selected carrier(s) as candidate carrier(s) for Tx carrier (re)selection procedure if there is no up-to-date information for RSRP or RSRQ or CBR of carrier(s) associated sidelink communication between UE1 and UE2 (e.g. because UE1 doesn't provide them).

After Tx carrier (re)selection, UE2 provides final selected carrier(s) and the other selected carriers to UE1. Based on the final selected carriers, sidelink communication is performed (i.e. sidelink data/signaling is transmitted via the final selected carrier(s)). UE1 and UE2 store the other selected carrier(s) and perform monitoring for RSRP or RSRQ or CBR of other selected carrier(s).

Figure 7:
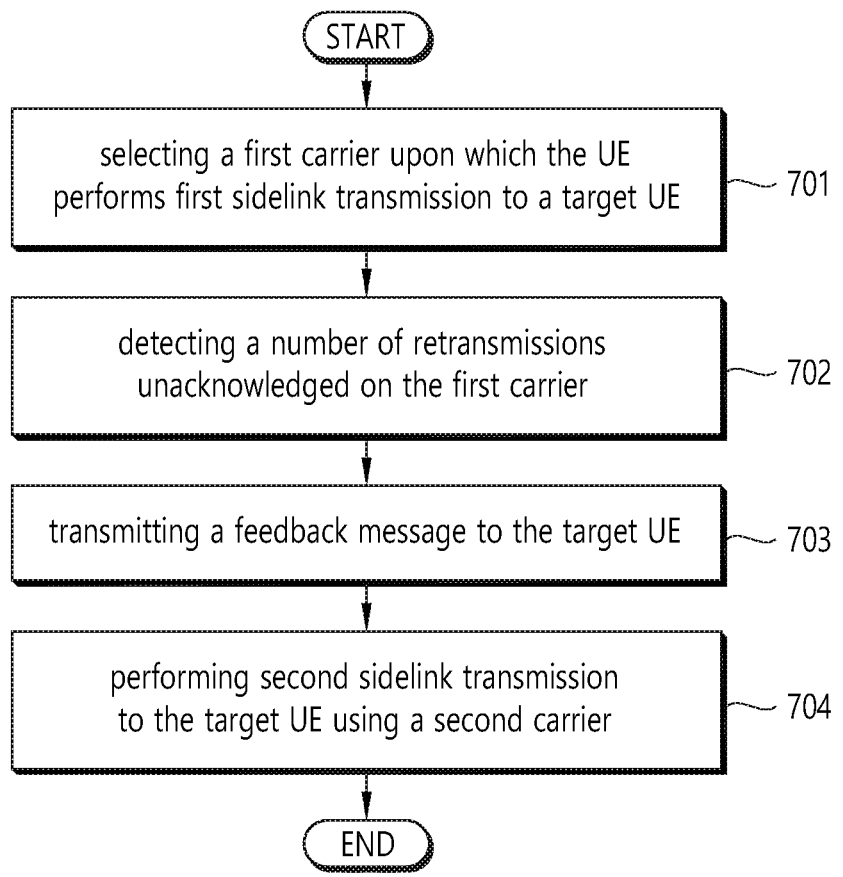
FIG. 7 shows a method for reselecting a TX carrier, according to some embodiments of the present disclosure.

FIG. 7 shows a method for reselecting a TX carrier, according to some embodiments of the present disclosure. Hereinafter, differences from the above-described example embodiments will be mainly described.

In step 701, the UE may select a first carrier upon which the UE performs first sidelink transmission based on the first carrier to a target UE. The UE may select a first carrier and candidate carriers. The UE may use the first carrier to perform first sidelink transmission and store the candidate carriers for TX carrier reselection. The UE may transmit an information of the candidate carriers to the target UE. The UE and/or the target UE may monitor the candidate carriers for TX carrier reselection.

In step 702, the UE may detects a number of retransmissions unacknowledged on the first carrier. The UE may detect the number of retransmissions unacknowledged has been reached to a maximum number of retransmissions. The maximum number of retransmissions may be pre-determined.

In step 703, the UE may transmit a feedback message to the target UE, when the detected number of retransmissions unacknowledged has been reached to a maximum number of retransmissions. For example, the feedback message may include an information of a second carrier selected by the UE. For other example, the feedback message may include an information on that the detected number of retransmissions unacknowledged on the first carrier has been reached to the maximum number of retransmission. The feedback message may include an information of the first carrier and/or a logical channel identities (IDs) where the detected number of retransmissions unacknowledged has been reached to the maximum number of retransmissions.

In step 704, the UE may perform second sidelink transmission to the target UE based on a second carrier different from the first carrier. The second carrier may be selected by UE or the target UE. For example, the UE and the target UE may negotiate each other to select the target UE.

Figure 8:
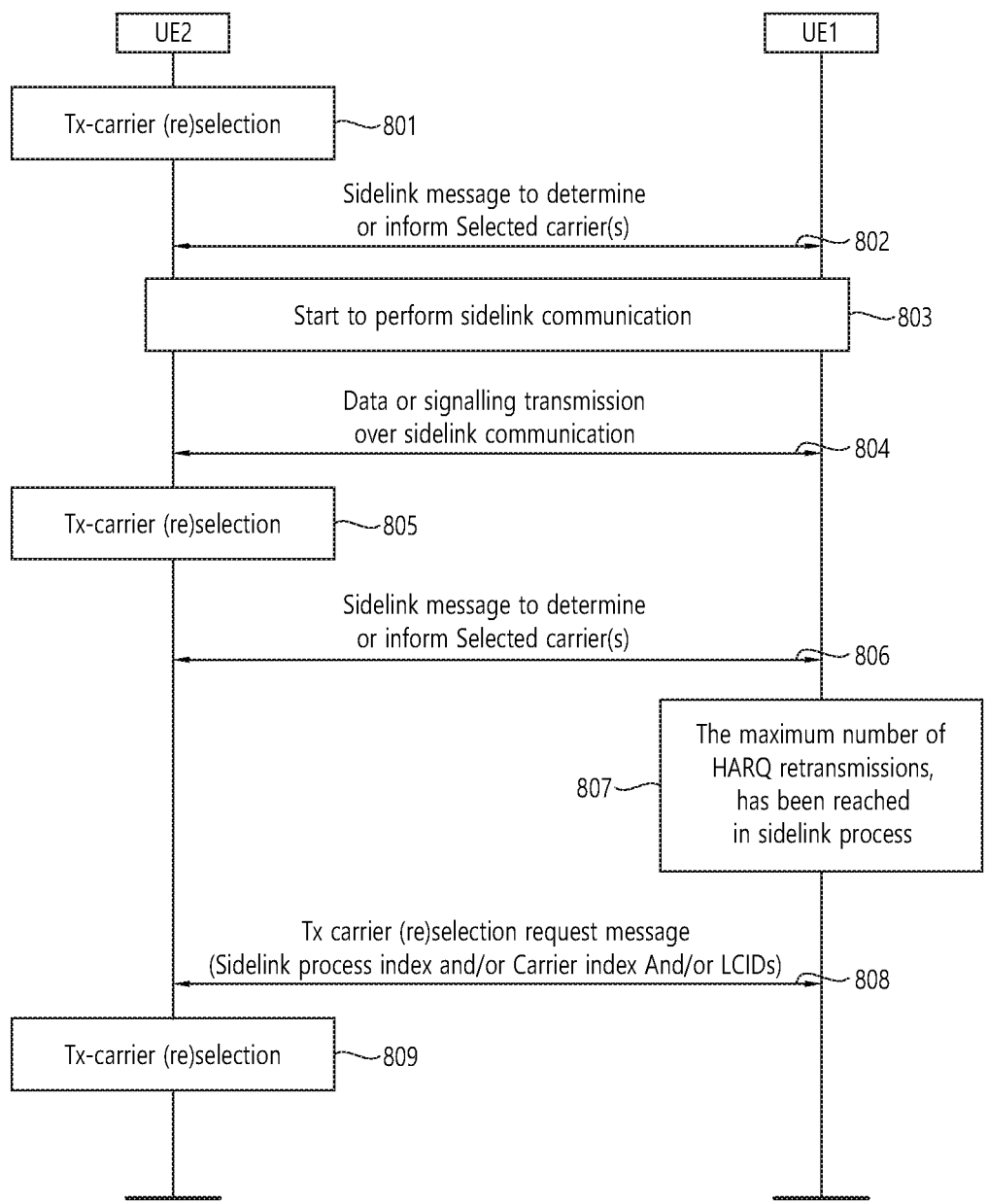
FIG. 8 shows a method of TX carrier reselection after packet retransmission failure, according to some embodiments of the present disclosure.

FIG. 8 shows a method of TX carrier reselection after packet retransmission failure, according to some embodiments of the present disclosure. Hereinafter, differences from the above-described example embodiments will be mainly described.

In step 801, UE2 may select a TX carrier for sidelink communication.

In step 802, UE2 may transmit a sidelink message to the UE1 to determine and/or inform the selected carrier(s). For example, UE1 may select a TX carrier for sidelink communication and transmit a sidelink message to UE2 to determine and/or inform the selected carrier(s).

In step 803, UE1 perform sidelink communication for unicast and/or groupcast with UE2. In the case of groupcast, UE1 can be one of group members.

In step 804, UE1 may provide information for signalling strength or quality (i.e. RSRP or RSRQ) of carriers associated to the sidelink communication with UE2. UE2 may provide which carrier's information the UE1 need to provide.

In step 805, UE2 performs Tx carrier (re)selection, based on the information UE1 provide.

In step 806, UE2 provides final selected carriers to UE1 as a sidelink message. With the selected carrier(s), sidelink communication between UE1 and UE2 is performed. Final selected carrier(s) is used for the sidelink communication. Other selected carrier(s) may be stored in each UE for the case the final selected carrier(s) will not be available (e.g., because the maximum number of HARQ retransmissions has been reached on any resource of the final selected carrier). UE2 also provides the other selected carrier(s) to UE1. UE1 and UE2 store the other selected carrier(s) and perform monitoring for RSRP or RSRQ of other selected carrier(s).

In step 807, UE1s detect the maximum number of HARQ retransmissions has been reached on any resource indicated in the configured sidelink grant associated with sidelink process.

In step 808, UE1 sends sidelink message to UE2 to request/trigger TX carrier (re)selection. The sidelink message may include associated sidelink process index and/or carrier index and/or logical channel IDs where the maximum number of HARQ retransmissions has been reached. The sidelink message may include cause value that maximum number of HARQ retransmissions has been reached. The sidelink message may provide RSRP or RSRQ or CBR of carrier(s) associated sidelink communication between UE1 and UE2.

In step 809, upon receiving the sidelink message, UE2 performs Tx carrier (re)selection procedure. During performing Tx carrier (re)selection procedure, carrier(s) on which the maximum number of HARQ retransmissions has been reached (i.e. associated to the sidelink process) may not be considered as candidate carrier(s) for Tx carrier (re) selection procedure.

Figure 9:
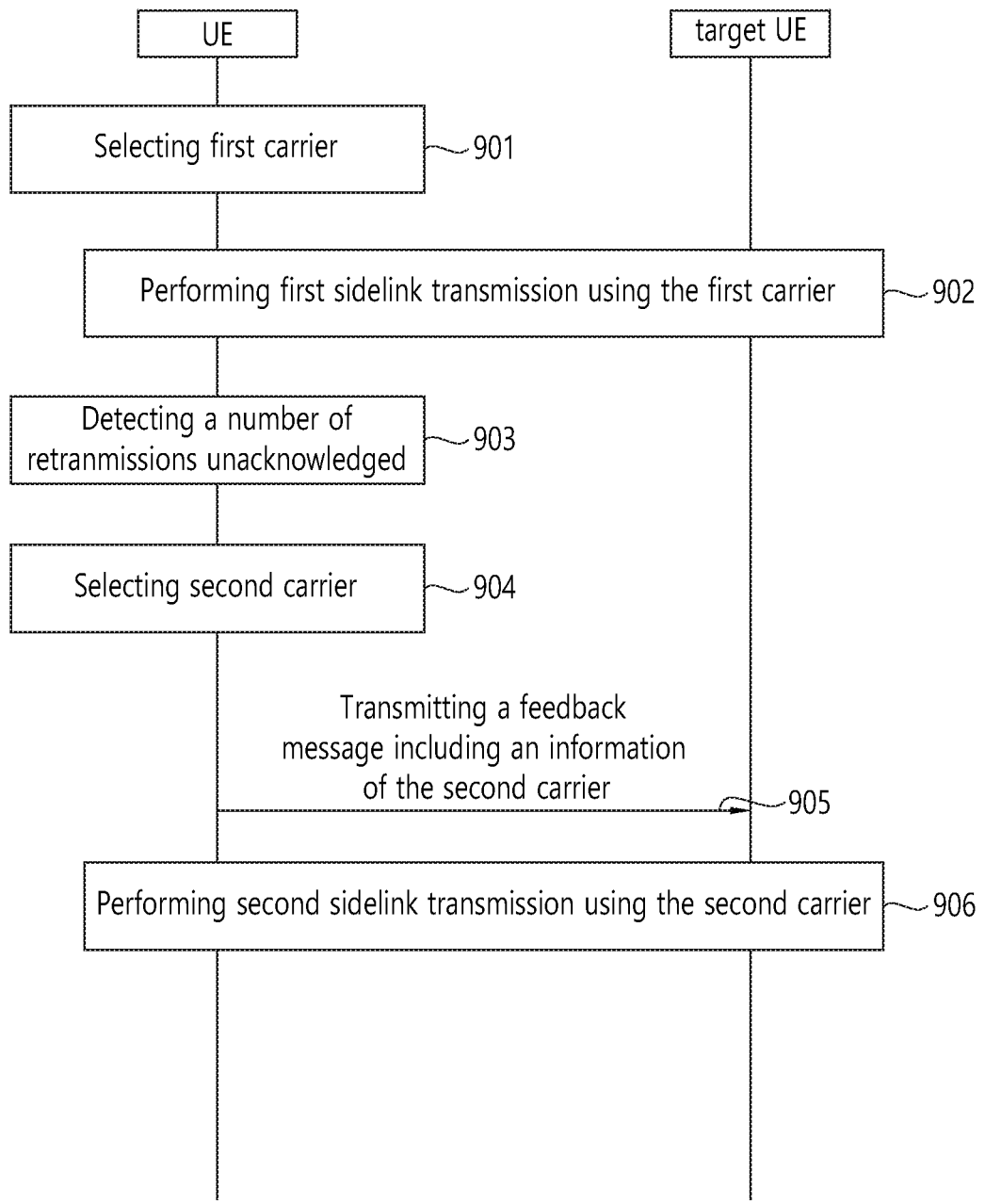
FIG. 9 shows a method for reselecting a TX carrier, according to some embodiments of the present disclosure.

FIG. 9 shows a method for reselecting a TX carrier, according to some embodiments of the present disclosure.

Referring to FIG. 8, a UE perform sidelink communication with a target UE. For example, the UE and the target UE may be involved in a unicast, groupcast, or broadcast system.

In step 901, the UE may select a first carrier upon which the UE performs first sidelink transmission based on the first carrier to a target UE. The UE may select a first carrier and candidate carriers. The UE may use the first carrier to perform first sidelink transmission and store the candidate carriers for TX carrier reselection. The UE may transmit an information of the candidate carriers to the target UE. The target UE may receive an information of the candidate carriers.

In step 902, the UE may perform first sidelink transmission using the first carrier to the target UE. For example, the first sidelink transmission use at least one of unicast, groupcast, or broadcast manner. The UE and/or the target UE may monitor the candidate carriers for TX reselection. For example, the UE and/or the target UE may monitor RSRP and/or RSRQ and/or CBR of the candidate carriers.

In step 903, the UE may detects a number of retransmissions unacknowledged on the first carrier. The UE may detect the number of retransmissions unacknowledged has been reached to a maximum number of retransmissions. The maximum number of retransmissions may be pre-determined.

In step 904, the UE may select the second carrier different from the first carrier. The UE may select the second carrier, when the detected number of retransmissions unacknowledged has been reached to a maximum number of retransmissions. The UE may select the second carrier among the stored candidate carriers.

For example, the UE may receive an authority to determine the second carrier from a network or the target UE. The UE may be determined as a determining UE which reselect the second carrier for sidelink communication. For another example, the target UE may receive an authority to determine the second carrier from a network or the target UE. For another example, the UE and the target UE may negotiate which one has the authority to determine the second carrier.

In step 905, the UE may transmit a feedback message to the target UE, when the detected number of retransmissions unacknowledged has been reached to a maximum number of retransmissions. The feedback message may include an information of the second carrier. The feedback message may include a configuration for performing a sidelink communication using the selected second carrier.

In step 906, the UE may perform second sidelink transmission to the target UE using the second carrier different from the first carrier. For example, the second sidelink transmission use at least one of unicast, groupcast, or broadcast manner.

Figure 10:
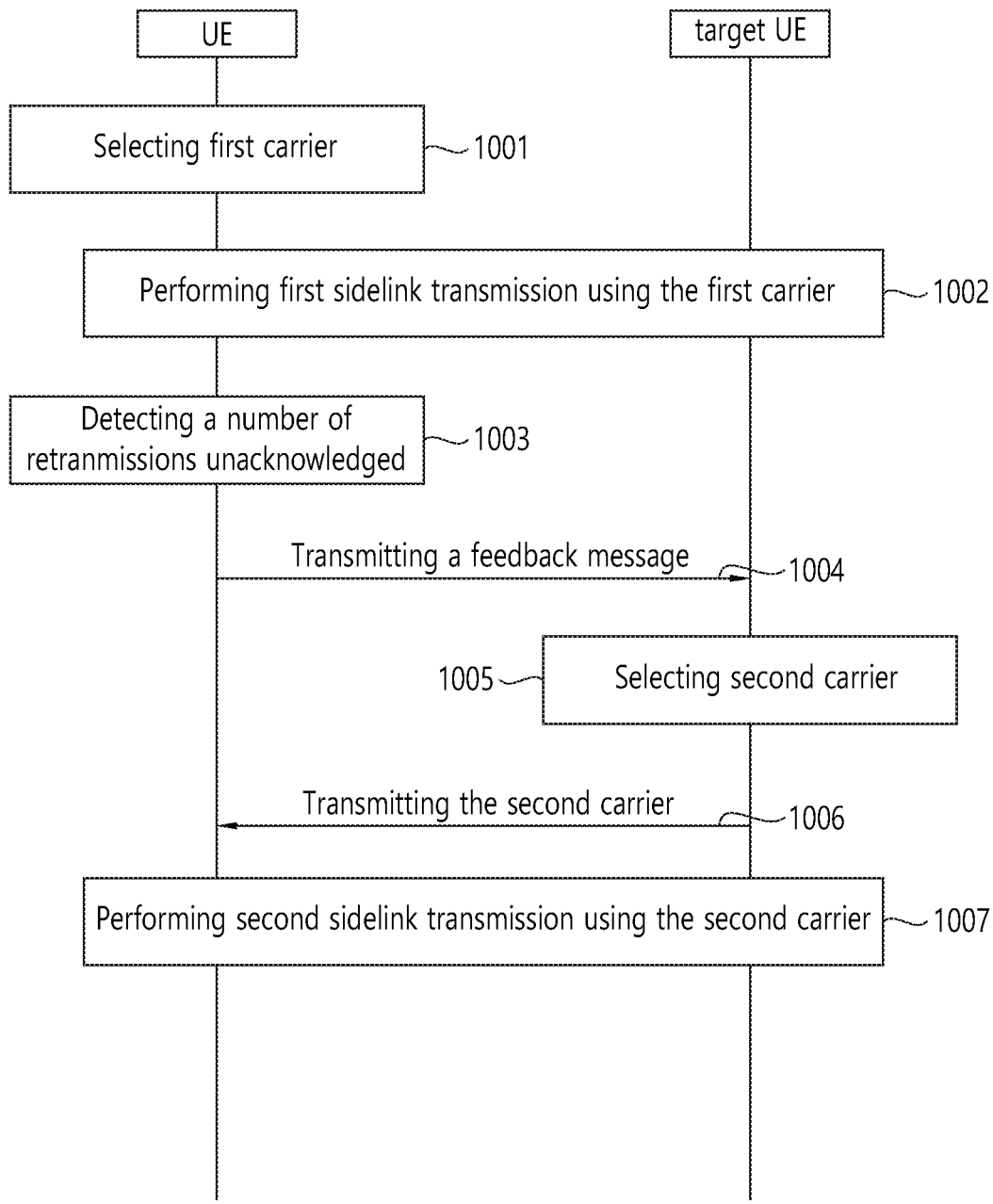
FIG. 10 shows an example of a method for reselecting a TX carrier, according to some embodiments of the present disclosure.

FIG. 10 shows an example of a method for reselecting a TX carrier, according to some embodiments of the present disclosure. Hereinafter, differences from the above-described example embodiments will be mainly described.

Referring to FIG. 9, a UE perform sidelink communication with a target UE. For example, the UE and the target UE may be involved in a unicast, groupcast, or broadcast system.

In step 1001, the UE may select a first carrier upon which the UE performs first sidelink transmission based on the first carrier to a target UE. The UE may select a first carrier and candidate carriers. The UE may transmit an information of the candidate carriers to the target UE.

In step 1002, the UE may perform first sidelink transmission using the first carrier to the target UE.

In step 1003, the UE may detects a number of retransmissions unacknowledged on the first carrier.

In step 1004, the UE may transmit a feedback message to the target UE, when the detected number of retransmissions unacknowledged has been reached to a maximum number of retransmissions. The feedback message may include an information on that the detected number of retransmissions unacknowledged on the first carrier has been reached to the maximum number of retransmission. The feedback message may include an information of the first carrier and/or a logical channel identities (IDs) where the detected number of retransmissions unacknowledged has been reached to the maximum number of retransmissions.

In step 1005, the target UE may select the second carrier different from the first carrier. The target UE may select the second carrier based on the information included in the feedback message. The target UE may select the second carrier among the candidate carriers received from the UE.

For example, the target UE may receive an authority to determine the second carrier from a network or the target UE. The target UE may be determined as a determining UE which reselect the second carrier for sidelink communication.

In step 1006, the target UE may transmit the selected second carrier to the UE. The UE may receive the second carrier for a second sidelink communication from the target UE.

In step 1007, the UE may perform second sidelink transmission to the target UE using the second carrier different from the first carrier. For example, the second sidelink transmission use at least one of unicast, groupcast, or broadcast manner.

Figure 11:
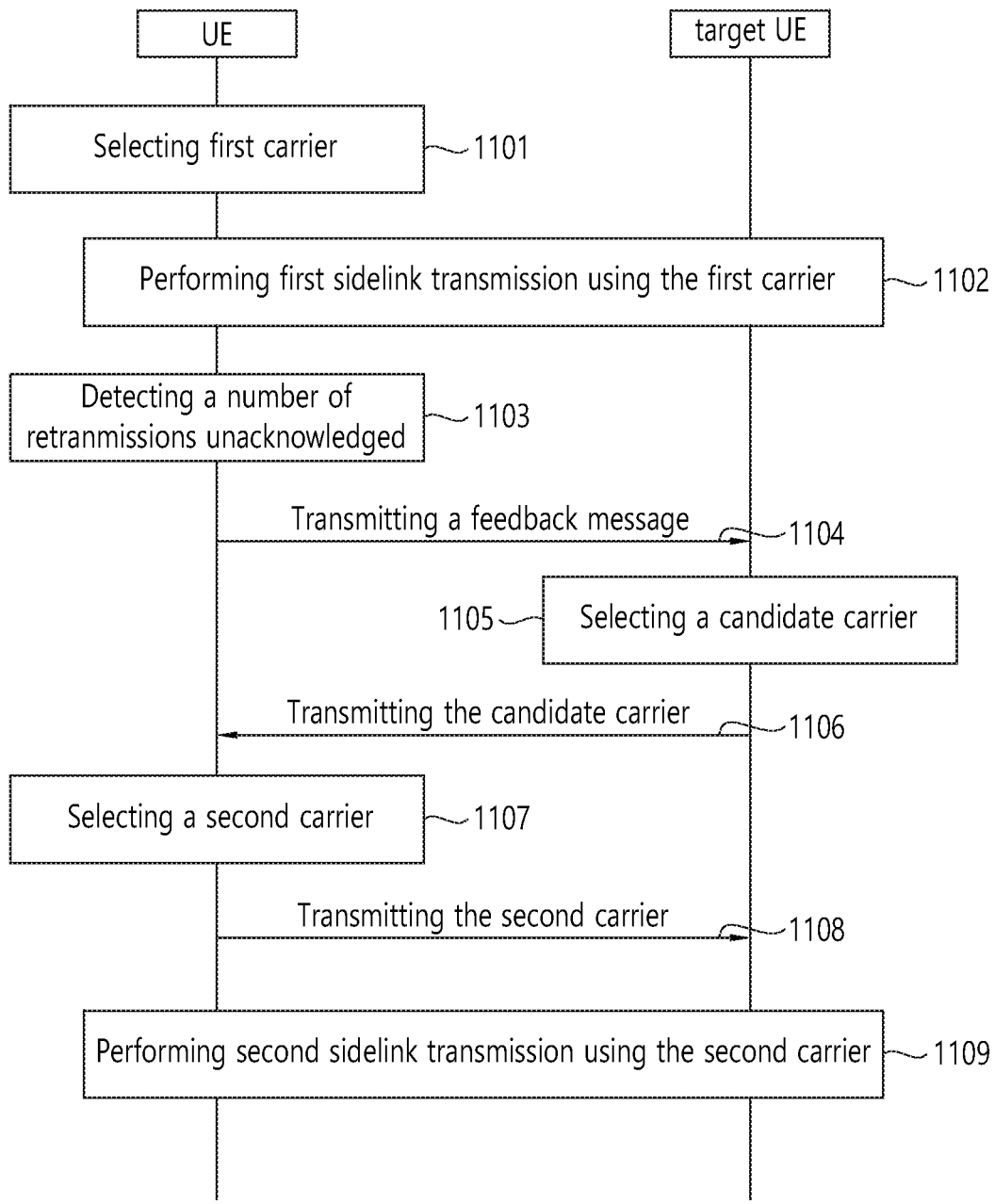
FIG. 11 shows a method for reselecting a TX carrier, according to some embodiments of the present disclosure.

FIG. 11 shows a method for reselecting a TX carrier, according to some embodiments of the present disclosure. Hereinafter, differences from the above-described example embodiments will be mainly described.

Referring to FIG. 10, a UE perform sidelink communication with a target UE. For example, the UE and the target UE may be involved in a unicast, groupcast, or broadcast system.

In step 1101, the UE may select a first carrier upon which the UE performs first sidelink transmission based on the first carrier to a target UE. The UE may select a first carrier and candidate carriers. The UE may transmit an information of the candidate carriers to the target UE.

In step 1102, the UE may perform first sidelink transmission using the first carrier to the target UE.

In step 1103, the UE may detects a number of retransmissions unacknowledged on the first carrier.

In step 1104, the UE may transmit a feedback message to the target UE, when the detected number of retransmissions unacknowledged has been reached to a maximum number of retransmissions. The feedback message may include an information on that the detected number of retransmissions unacknowledged on the first carrier has been reached to the maximum number of retransmission. The feedback message may include an information of the first carrier and/or a logical channel identities (IDs) where the detected number of retransmissions unacknowledged has been reached to the maximum number of retransmissions.

In step 1105, the target UE may select a first candidate carrier. The target UE may select the first candidate carrier based on the information included in the feedback message. The target UE may select the first candidate carrier among the candidate carriers received from the UE. The target UE may select plurality of candidate carriers based on the feedback message.

In step 1106, the target UE may transmit the first candidate carrier to the UE. The UE may receive the first candidate carrier from the target UE. The target UE may transmit the plurality of the candidate carriers to the UE. The UE may receive the plurality of candidate carriers from the target UE.

In step 1107, the UE may select the second carrier different from the first carrier based on the first candidate carrier from the target UE. For example, the UE may select the first candidate carrier as the second carrier. For other example, the UE may select a second candidate carrier and choose either the first candidate carrier or the second candidate carrier as the second carrier. The UE may select one of the plurality of candidate carriers as the second carrier. The UE may store unselected candidate carrier and monitor the unselected carrier.

In step 1108, the UE may transmit the selected second carrier to the target UE. The target UE may receive the second carrier for a second sidelink communication from the UE.

In step 1109, the UE may perform second sidelink transmission to the target UE using the second carrier different from the first carrier. For example, the second sidelink transmission use at least one of unicast, groupcast, or broadcast manner.

Figure 12:
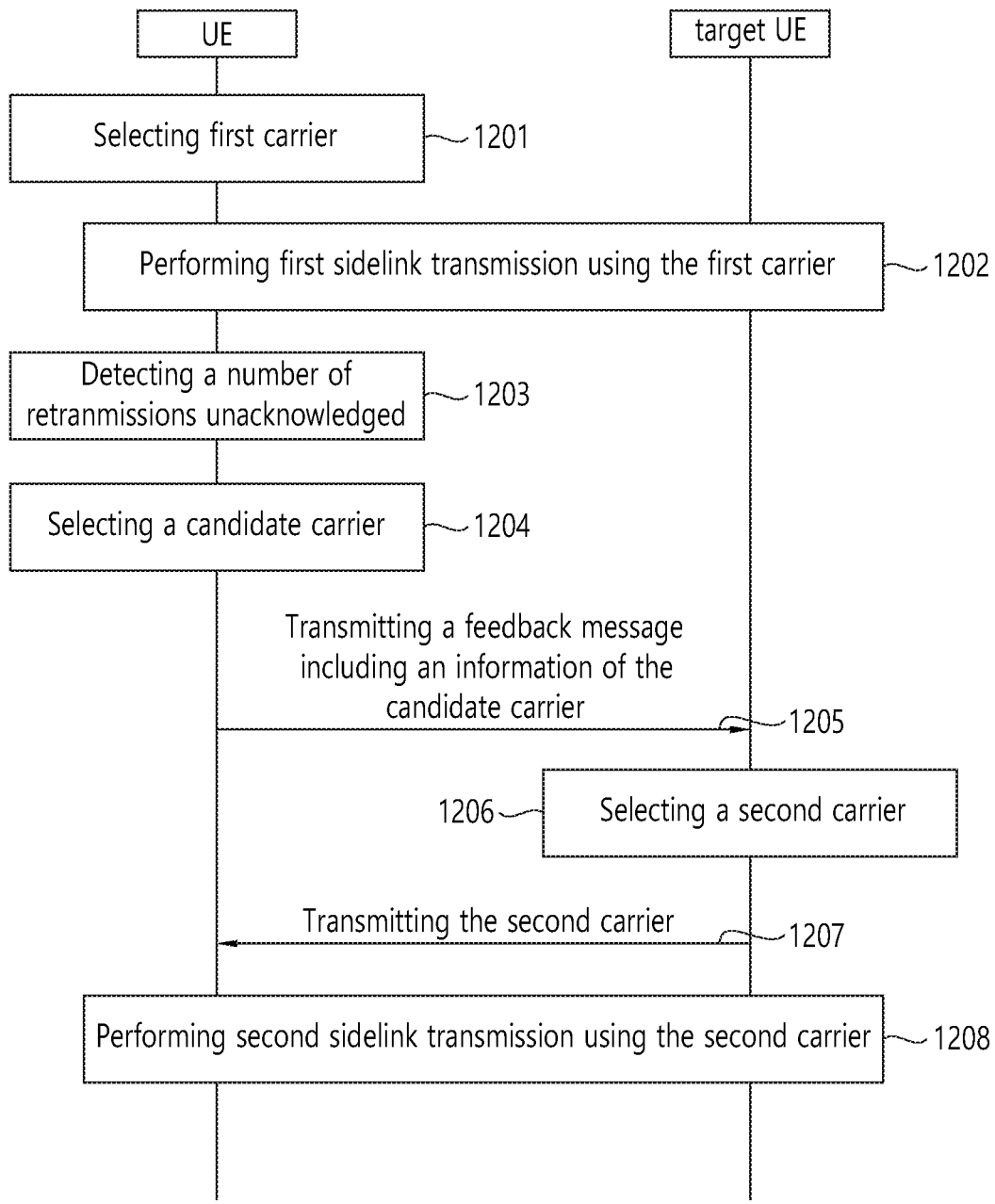
FIG. 12 shows a method for reselecting a TX carrier, according to some embodiments of the present disclosure.

FIG. 12 shows a method for reselecting a TX carrier, according to some embodiments of the present disclosure. Hereinafter, differences from the above-described example embodiments will be mainly described.

Referring to FIG. 12, a UE perform sidelink communication with a target UE. For example, the UE and the target UE may be involved in a unicast, groupcast, or broadcast system.

In step 1201, the UE may select a first carrier upon which the UE performs first sidelink transmission based on the first carrier to a target UE. The UE may select a first carrier and candidate carriers. The UE may store the candidate carriers.

In step 1202, the UE may perform first sidelink transmission using the first carrier to the target UE.

In step 1203, the UE may detects a number of retransmissions unacknowledged on the first carrier.

In step 1204, the UE may select a first candidate carrier. The UE may select the first candidate carrier, when the detected number of retransmissions unacknowledged has been reached to a maximum number of retransmissions. The UE may select the first candidate carrier among the stored candidate carriers. The UE may select plurality of candidate carriers.

In step 1205, the UE may transmit a feedback message to the target UE. The UE may transmit a feedback message to the target UE, when the detected number of retransmissions unacknowledged has been reached to a maximum number of retransmissions. The feedback message may include an information of the first candidate carrier or the plurality of the candidate carriers.

In step 1206, the target UE may select the second carrier different from the first carrier based on the first candidate carrier from the UE. For example, the target UE may select the first candidate carrier as the second carrier. For other example, the target UE may select a second candidate carrier and choose either the first candidate carrier or the second candidate carrier as the second carrier. The target UE may select one of the plurality of candidate carriers as the second carrier. The target UE may store unselected candidate carrier and monitor the unselected carrier.

In step 1207, the target UE may transmit the selected second carrier to the UE. The UE may receive the second carrier for a second sidelink communication from the target UE. The target UE may transmit the unselected candidate carrier to the UE. The UE may store and monitor the unselected carrier.

In step 1208, the UE may perform second sidelink transmission to the target UE using the second carrier different from the first carrier.

According to some embodiments of the present disclosure shown in FIGS. 7 to 12, the UE and/or the target UE may consider a number of retransmissions unacknowledged (for example, HARQ NACK) as a condition for triggering TX carrier reselection. The UE and/or the target UE may consider that TX carrier reselection may be required when a number of retransmissions unacknowledged has been reached to a maximum number of retransmissions on any resource indicated in a configured sidelink grant of a certain carrier.

In addition, according to some embodiments of the present disclosure shown in FIGS. 7 to 12, the UE and/or the target UE may exclude the carrier on which the maximum number or retransmissions unacknowledged has been reached for reselecting TX carrier. Furthermore, the UE and/or the target UE may exclude the carrier on which the maximum number or retransmissions unacknowledged has been reached from a group of candidate carrier for sidelink communication.

Hereinafter, an example of change for TS 36.321, according to some embodiments of the present disclosure, will be described. The underlined parts may indicate changes for TS 36.321. However, the present disclosure may not be limited thereto.

5.14.1.1 SL Grant reception and SCI transmission

In order to transmit on the SL-SCH the MAC entity must have at least one sidelink grant.

Sidelink grants are selected as follows for sidelink communication:

if the MAC entity is configured to receive a single sidelink grant dynamically on the PDCCH and more data is available in STCH than can be transmitted in the current SC period, the MAC entity shall:

using the received sidelink grant determine the set of subframes in which transmission of SCI and transmission of first transport block occur according to subclause 14.2.1 of TS 36.213 [2];

consider the received sidelink grant to be a configured sidelink grant occurring in those subframes starting at the beginning of the first available SC Period which starts at least 4 subframes after the subframe in which the sidelink grant was received, overwriting a previously configured sidelink grant occurring in the same SC period, if available;

clear the configured sidelink grant at the end of the corresponding SC Period;

else, if the MAC entity is configured by upper layers to receive multiple sidelink grants dynamically on the PDCCH and more data is available in STCH than can be transmitted in the current SC period, the MAC entity shall for each received sidelink grant:

using the received sidelink grant determine the set of subframes in which transmission of SCI and transmission of first transport block occur according to subclause 14.2.1 of TS 36.213 [2];

consider the received sidelink grant to be a configured sidelink grant occurring in those subframes starting at the beginning of the first available SC Period which starts at least 4 subframes after the subframe in which the sidelink grant was received, overwriting a previously configured sidelink grant received in the same subframe number but in a different radio frame as this configured sidelink grant occurring in the same SC period, if available;

clear the configured sidelink grant at the end of the corresponding SC Period;

else, if the MAC entity is configured by upper layers to transmit using one or multiple pool(s) of resources as indicated in subclause 5.10.4 of TS 36.331 [8] and more data is available in STCH than can be transmitted in the current SC period, the MAC entity shall for each sidelink grant to be selected:

if configured by upper layers to use a single pool of resources:

select that pool of resources for use;

else, if configured by upper layers to use multiple pools of resources:

select a pool of resources for use from the pools of resources configured by upper layers whose associated priority list includes the priority of the highest priority of the sidelink logical channel in the MAC PDU to be transmitted;

NOTE 1: If more than one pool of resources has an associated priority list which includes the priority of the sidelink logical channel with the highest priority in the MAC PDU to be transmitted, it is left for UE implementation which one of those pools of resources to select.

randomly select the time and frequency resources for SL-SCH and SCI of a sidelink grant from the selected resource pool. The random function shall be such that each of the allowed selections (see TS 36.213 [2]) can be chosen with equal probability;

use the selected sidelink grant to determine the set of subframes in which transmission of SCI and transmission of first transport block occur according to subclause 14.2.1 of TS 36.213 [2];

consider the selected sidelink grant to be a configured sidelink grant occurring in those subframes starting at the beginning of the first available SC Period which starts at least 4 subframes after the subframe in which the sidelink grant was selected;

clear the configured sidelink grant at the end of the corresponding SC Period;

NOTE 2: Retransmissions on SL-SCH cannot occur after the configured sidelink grant has been cleared.

NOTE 3: If the MAC entity is configured by upper layers to transmit using one or multiple pool(s) of resources as indicated in subclause 5.10.4 of TS 36.331 [8], it is left for UE implementation how many sidelink grants to select within one SC period taking the number of sidelink processes into account.

Sidelink grants are selected as follows for V2X sidelink communication:

if the MAC entity is configured to receive a sidelink grant dynamically on the PDCCH and data is available in STCH, the MAC entity shall for each carrier configured in sl-V2X-ConfigDedicated for which a sidelink grant has been dynamically received on the PDCCH for this TTI:

use the received sidelink grant to determine the number of HARQ retransmissions and the set of subframes in which transmission of SCI and SL-SCH occur according to subclauses 14.2.1 and 14.1.1.4A of TS 36.213 [2];

consider the received sidelink grant to be a configured sidelink grant for the carrier;

if the MAC entity is configured by upper layers to receive a sidelink grant on the PDCCH addressed to SL Semi-Persistent Scheduling V-RNTI, the MAC entity shall for each SL SPS configuration and for each carrier configured in sl-V2X-ConfigDedicated for which a sidelink grant has been received on the PDCCH addressed to SL Semi-Persistent Scheduling V-RNTI for this TTI:

if PDCCH contents indicate SPS activation:

use the received sidelink grant to determine the number of HARQ retransmissions and the set of subframes in which transmission of SCI and SL-SCH occur according to subclauses 14.2.1 and 14.1.1.4A of TS 36.213 [2];

consider the received sidelink grant to be a configured sidelink grant for the carrier.

| 5.14.1.1 SL Grant reception and SCI transmission |
| --- | if PDCCH contents indicate SPS release:
        clear the corresponding configured sidelink grant for the carrier.
    if the MAC entity is configured by upper layers to transmit using pool(s) of resources in one or multiple carriers as indicated in subclause 5.10.13.1 of TS 36.331 [8] based on sensing, or partial sensing, or random selection only if upper layers indicates that transmissions of multiple MAC PDUs are allowed according to subclause 5.10.13.1a of TS 36.331 [8], and the MAC entity selects to create a configured sidelink grant corresponding to transmissions of multiple MAC PDUs, and data is available in STCH associated with one or multiple carriers, the MAC entity shall for each Sidelink process configured for multiple transmissions:
        if there is no configured sidelink grant on any carrier allowed for the STCH associated with the Sidelink process as indicated by upper layers, as specified in TS 24.386 [15]:
            trigger the TX carrier (re-)selection procedure as specified in sub-clause 5.14.1.5;
        else if there is a configured sidelink grant associated with the Sidelink process:
            if SL_RESOURCE_RESELECTION_COUNTER = 0 and when SL_RESOURCE_RESELECTION_COUNTER was equal to 1 the MAC entity randomly selected, with equal probability, a value in the interval [0, 1] which is above the probability configured by upper layers in probResourceKeep; or
            if neither transmission nor retransmission has been performed by the MAC entity on any resource indicated in the configured sidelink grant during the last second; or
            if sl-ReselectAfter is configured and the number of consecutive unused transmission opportunities on resources indicated in the configured sidelink grant is equal to sl-ReselectAfter; or
            if none of the configured sidelink grant(s) on the carrier(s) allowed for the STCH have radio resources available in this TTI to accommodate a RLC SDU according to subclause 5.14.1.3.1 by using the maximum allowed MCS configured by upper layers in maxMCS-PSSCH and the MAC entity selects not to segment the RLC SDU; or
        NOTE 4:       If none of the configured sidelink grant(s) on the carrier(s) allowed for the STCH have radio resources available in this TTI to accommodate the RLC SDU according to subclause 5.14.1.3.1, it is left for UE implementation whether to perform segmentation or sidelink resource reselection.
            if none of the configured sidelink grant(s) on the carrier(s) allowed for the STCH have radio resources available in this TTI, according to subclause 5.14.1.3.1 to fulfil the latency requirement of the data in a sidelink logical channel according to the associated PPPP, and the MAC entity selects not to perform transmission(s) corresponding to a single MAC PDU; or
        NOTE 5:       If the latency requirement is not met, it is left for UE implementation whether to perform transmission(s) corresponding to single MAC PDU or sidelink resource reselection.
        <u>if the maximum number of HARQ retransmissions, has been reached on any resource indicated in the configured sidelink grant associated with sidelink process; or</u>
        if the pool of resources where the sidelink grant is configured for the Sidelink process, is reconfigured by upper layers:
            clear the configured sidelink grant;
            flush the HARQ buffer associated to the Sidelink process;
            trigger the TX carrier (re-)selection procedure as specified in sub-clause 5.14.1.5;
        if the TX carrier (re-)selection procedure is triggered in above and the carrier is (re-)selected in the Tx carrier (re-)selection according to sub-clause 5.14.1.5, the following is performed on the selected carrier:
            select one of the allowed values configured by upper layers in restrictResourceReservationPeriod and set the resource reservation interval by multiplying 100 with the selected value;
        NOTE 6:       How the UE selects this value is up to UE implementation.
            randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;
            select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers according to TS 36.214 [6] if CBR measurement results are available or the corresponding defaultTxConfigIndex configured by upper layers if CBR measurement results are not available;
            select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers according to TS 36.214 [6] if CBR measurement results are available or the corresponding defaultTxConfigIndex configured by upper layers if CBR measurement results are not available;

| 5.14.1.1 SL Grant reception and SCI transmission |
| --- | if transmission based on random selection is configured by upper layers:
      randomly select the time and frequency resources for one transmission opportunity from the resource pool, according to the amount of selected frequency resources. The random function shall be such that each of the allowed selections can be chosen with equal probability;
    else:
      randomly select the time and frequency resources for one transmission opportunity from the resources indicated by the physical layer according to subclause 14.1.1.6 of TS 36.213 [2], according to the amount of selected frequency resources. The random function shall be such that each of the allowed selections can be chosen with equal probability;
    use the randomly selected resource to select a set of periodic resources spaced by the resource reservation interval for transmission opportunities of SCI and SL-SCH corresponding to the number of transmission opportunities of MAC PDUs determined in subclause 14.1.1.4B of TS 36.213 [2];
      if the number of HARQ retransmissions is equal to 1:
        if transmission based on random selection is configured by upper layers and there are available resources in the resource pool that meet the conditions in subcause 14.1.1.7 of TS 36.213 [2] for one more transmission opportunity; or
        if transmission based on sensing or partial sensing is configured by upper layers and there are available resources left in the resources indicated by the physical layer according to subclause 14.1.1.6 of TS 36.213 [2] that meet the conditions in subclause 14.1.1.7 of TS 36.213 [2] for more transmission opportunities:
          randomly select the time and frequency resources for one transmission opportunity from the available resources, according to the amount of selected frequency resources. The random function shall be such that each of the allowed selections can be chosen with equal probability;
          use the randomly selected resource to select a set of periodic resources spaced by the resource reservation interval for the other transmission opportunities of SCI and SL-SCH corresponding to the number of retransmission opportunities of the MAC PDUs determined in subclause 14.1.1.4B of TS 36.213 [2];
          consider the first set of transmission opportunities as the new transmission opportunities and the other set of transmission opportunities as the retransmission opportunities;
          consider the set of new transmission opportunities and retransmission opportunities as the selected sidelink grant.
    else:
      consider the set as the selected sidelink grant;
    use the selected sidelink grant to determine the set of subframes in which transmissions of SCI and SL-SCH occur according to subclause 14.2.1 and 14.1.1.4B of TS 36.213 [2];
    consider the selected sidelink grant to be a configured sidelink grant;
  else if SL_RESOURCE_RESELECTION_COUNTER = 0 and when SL_RESOURCE_RESELECTION_COUNTER was equal to 1 the MAC entity randomly selected, with equal probability, a value in the interval [0, 1] which is less than or equal to the probability configured by upper layers in probResourceKeep:
    clear the configured sidelink grant, if available;
    randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;
    use the previously selected sidelink grant for the number of transmissions of the MAC PDUs determined in subclause 14.1.1.4B of TS 36.213 [2] with the resource reservation interval to determine the set of subframes in which transmissions of SCI and SL-SCH occur according to subclauses 14.2.1 and 14.1.1.4B of TS 36.213 [2];
    consider the selected sidelink grant to be a configured sidelink grant;
  else, if the MAC entity is configured by upper layers to transmit using pool(s) of resources in one or multiple carriers as indicated in subclause 5.10.13.1 of TS 36.331 [8], the MAC entity selects to create a configured sidelink grant corresponding to transmission(s) of a single MAC PDU, and data is available in STCH associated with one or multiple carriers <u>and the maximum number of HARQ retransmissions, has been reached on any resource indicated in the configured sidelink grant associated with sidelink process</u>, the MAC entity shall for a Sidelink process:
    trigger the TX carrier (re-)selection procedure as specified in sub-clause 5.14.1.5;
    if the carrier is (re-)selected in the Tx carrier (re-)selection according to sub-clause 5.14.1.5, the following is performed on the selected carrier:
      select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers according to TS 36.214 [6] if CBR measurement results are available or the corresponding defaultTxConfigIndex configured by upper layers if CBR measurement results are not available;
      select an amount of frequency resources within the range that is configured by upper layers between minSubchannel-NumberPSSCH and maxSubchannel-NumberPSSCH included in pssch-TxConfigList and, if configured by upper layers, overlapped between

| 5.14.1.1 SL Grant reception and SCI transmission |
| --- | minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers according to TS 36.214 [6] if CBR measurement results are available or the corresponding defaultTxConfigIndex configured by upper layers if CBR measurement results are not available;
    if transmission based on random selection is configured by upper layers:
        randomly select the time and frequency resources for one transmission opportunity of SCI and SL-SCH from the resource pool, according to the amount of selected frequency resources. The random function shall be such that each of the allowed selections can be chosen with equal probability;
    else:
        randomly select the time and frequency resources for one transmission opportunity of SCI and SL-SCH from the resources indicated by the physical layer according to subclause 14.1.1.6 of TS 36.213 [2], according to the amount of selected frequency resources. The random function shall be such that each of the allowed selections can be chosen with equal probability;
    if the number of HARQ retransmissions is equal to 1:
        if transmission based on random selection is configured by upper layers and there are available resources in the resource pool that meet the conditions in subcause 14.1.1.7 of TS 36.213 [2] for one more transmission opportunity; or:
        if transmission based on sensing or partial sensing is configured by upper layers and there are available resources left in the resources indicated by the physical layer according to subclause 14.1.1.6 of TS 36.213 [2] that meet the conditions in subcause 14.1.1.7 of TS 36.213 [2] for one more transmission opportunity:
            randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;
            consider a transmission opportunity which comes first in time as the new transmission opportunity and a transmission opportunity which comes later in time as the retransmission opportunity;
            consider both of the transmission opportunities as the selected sidelink grant;
    else:
        consider the transmission opportunity as the selected sidelink grant;
    use the selected sidelink grant to determine the subframes in which transmission(s) of SCI and SL-SCH occur according to subclause 14.2.1 and 14.1.1.4B of TS 36.213 [2];
    consider the selected sidelink grant to be a configured sidelink grant.
  NOTE 7:    For V2X sidelink communication, the UE should ensure the randomly selected time and frequency resources fulfill the latency requirement.
  NOTE 8:    For V2X sidelink communication, when there is no overlapping between the chosen configuration(s) in pssch-TxConfigList and chosen configuration(s) indicated in cbr-pssch-TxConfigList, it is up to UE implementation whether the UE transmits and which transmitting parameters the UE uses between allowed configuration(s) indicated in pssch-TxConfigList and allowed configuration(s) indicated in cbr-pssch-TxConfigList.
  The MAC entity shall for each subframe:
  for each configured sidelink grant occurring in this subframe:
    if SL_RESOURCE_RESELECTION_COUNTER = 1 for the Sidelink process associated with the configured sidelink grant and the MAC entity randomly selected, with equal probability, a value in the interval [0, 1] which is above the probability configured by upper layers in probResourceKeep:
        set the resource reservation interval for the configured sidelink grant equal to 0;
    if the configured sidelink grant corresponds to transmission of SCI:
        for V2X sidelink communication in UE autonomous resource selection:
            consider the selected transmission format to be SL-V2X-TxProfile for the highest priority of the sidelink logical channel(s) in the MAC PDU (TS 36.331 [8]);
            select a MCS which is, if configured, within the range that is configured by upper layers between minMCS-PSSCH and maxMCS-PSSCH included in pssch-TxConfigList associated with the selected transmission format and, if configured by upper layers, overlapped between minMCS-PSSCH and maxMCS-PSSCH indicated in cbr-pssch-TxConfigList associated with the selected transmission format for the highest priority of the sidelink logical channel(s) in the MAC PDU and the CBR measured by lower layers according to TS 36.214 [6] if CBR measurement results are available or the corresponding defaultTxConfigIndex configured by upper layers if CBR measurement results are not available;
  NOTE 9:    MCS selection is up to UE implementation if the MCS or the corresponding range is not configured by upper layers.
  NOTE 10:    For V2X sidelink communication, when there is no overlapping between the chosen configuration(s) included in pssch-TxConfigList and chosen configuration(s) indicated in cbr-pssch-TxConfigList, it is up to UE implementation whether the UE transmits and which transmitting parameters the UE uses between allowed configuration(s) indicated in pssch-TxConfigList and allowed configuration(s) indicated in cbr-pssch-TxConfigList.

-continued

5.14.1.1 SL Grant reception and SCI transmission for V2X sidelink communication in scheduled resource allocation:
        consider the selected transmission format to be SL-V2X-TxProfile for the highest priority of the sidelink logical channel(s) in the MAC PDU (TS 36.331 [8]);
        select a MCS which is associated with the selected transmission format unless it is configured by upper layer;
        instruct the physical layer to transmit SCI corresponding to the configured sidelink grant;
        for V2X sidelink communication, deliver the configured sidelink grant, the associated HARQ information and the value of the highest priority of the sidelink logical channel(s) in the MAC PDU to the Sidelink HARQ Entity for this subframe;
    else if the configured sidelink grant corresponds to transmission of first transport block for sidelink communication:
        deliver the configured sidelink grant and the associated HARQ information to the Sidelink HARQ Entity for this subframe.
NOTE 11:     If the MAC entity has multiple configured sidelink grants occurring in one subframe and if not all of them can be processed due to the single-cluster SC-FDM restriction, it is left for UE implementation which one of these to process according to the procedure above.

5.14.1.5TX carrier (re-)selection for V2X sidelink communication

The MAC entity shall consider a CBR of a carrier to be one measured by lower layers according to TS 36.214 [6] if CBR measurement results are available, or the corresponding defaultTxConfigIndex configured by upper layers for the carrier if CBR measurement results are not available.
    If the TX carrier (re-)selection is triggered for a Sidelink process according to sub-clause 5.14.1.1, the MAC entity shall:
        if there is no configured sidelink grant on any carrier allowed for the sidelink logical channel where data is available as indicated by upper layers (TS 36.331 [8] and TS 24.386 [15]):
        for each carrier configured by upper layers associated with the concerned sidelink logical channel:
            if the CBR of the carrier is below threshCBR-FreqReselection associated with the priority of the sidelink logical channel <u>and the maximum number of HARQ retransmissions, has not been reached on any resource of the carrier</u>:
                <u>if the carrier belongs to the stored selected carriers if the stored carriers select is configured(or exists).</u>
                consider the carrier as a candidate carrier for TX carrier (re-)selection for the concerned sidelink logical channel.
        else:
        for each sidelink logical channel, if any, where data is available and that are allowed on the carrier for which Tx carrier (re-)selection is triggered according to subclause 5.14.1.1:
            if the CBR of the carrier is below threshCBR-FreqKeeping associated with priority of the sidelink logical channel <u>and the maximum number of HARQ retransmissions, has not been reached on any resource of the carrier</u>:
                <u>if the carrier belongs to the stored selected carriers if the stored select carriers is configured(or exists).</u>
                select the carrier and the associated pool of resources.
            else:
                for each carrier configured by upper layers on which the sidelink logical channel is allowed, if the CBR of the carrier is below threshCBR-FreqReselection associated with the priority of the sidelink logical channel <u>and the maximum number of HARQ retransmissions, has not been reached on any resource of the carrier</u>;
                    <u>if the carrier belongs to the stored selected carriers if the stored select carriers is configured(or exists).</u>
                    consider the carrier as a candidate carrier for TX carrier (re-)selection.
    The MAC entity shall:
        if one or more carriers are considered as the candidate carriers for TX carrier (re-)selection:
            for each sidelink logical channel allowed on the carrier where data is available and Tx carrier (re-)selection is triggered:
                select one or more carrier(s) and associated pool(s) of resources among the candidate carriers with increasing order of CBR from the lowest CBR.
NOTE 1:     It is left to UE implementation how many carriers to select based on UE capability.
NOTE 2:     It is left to UE implementation to determine the sidelink logical channels among the sidelink logical channels where data is available and that are allowed on the carrier for which Tx carrier (re-) selection is triggered.

| 5.14.1.5 TX carrier (re-)selection for V2X sidelink communication |
|---|
| NOTE 3: If the MAC entity is configured by the upper layer to receive a sidelink grant dynamically on the PDCCH, it is left to UE implementation to determine which carriers configured by upper layer in sl-V2X-ConfigDedicated, as specified in TS 36.331 [8] are considered as selected carriers for the sidelink synchronization procedures in subclauses 5.10.7, 5.10.8 and 5.10.8a of TS 36.331 [8]. |

| 5.14.1.3.1 Logical channel prioritization |
|---|
| The Logical Channel Prioritization procedure is applied when a new transmission is performed. Each sidelink logical channel has an associated priority which is the PPPP and optionally an associated PPPR. Multiple sidelink logical channels may have the same associated priority. The mapping between priority and LCID is left for UE implementation. If duplication is activated as specified in TS 36.323 [4], the MAC entity shall map different sidelink logical channels which correspond to the same PDCP entity onto different carriers in accordance with subclause 5.14.1.5, or onto different carriers of different carrier sets (if configured in allowedCarrierFreqList for the corresponding destination). For a given sidelink logical channel, it is up to UE implementation which carrier set to select among the carrier sets configured in allowedCarrierFreqList for the corresponding destination.<br>The MAC entity shall perform the following Logical Channel Prioritization procedure either for each SCI transmitted in an SC period in sidelink communication, or for each SCI corresponding to a new transmission in V2X sidelink communication:<br>The MAC entity shall allocate resources to the sidelink logical channels in the following steps:<br>Only consider sidelink logical channels not previously selected for this SC period and the SC periods (if any) which are overlapping with this SC period, to have data available for transmission in sidelink communication;<br>Only consider sidelink logical channels which meet the following conditions:<br>allowed on the carrier where the SCI is transmitted for V2X sidelink communication, if the carrier is configured by upper layers according to TS 36.331 [8] and TS 24.386 [15];<br>having a priority whose associated threshCBR-FreqReselection is no lower than the CBR of the carrier when the carrier is (re-)selected in accordance with 5.14.1.5;<br><u>associated to the carrier of which the maximum number of HARQ retransmissions, has not been reached on any resource</u><br>Only consider one sidelink logical channel among sidelink logical channels corresponding to same PDCP entity, if duplication is activated as specified in TS 36.323 [4].<br>Step 0: Select a ProSe Destination, having the sidelink logical channel with the highest priority, among the sidelink logical channels having data available for transmission and having the same transmission format as the one selected corresponding to the ProSe Destination;<br>NOTE: The sidelink logical channels belonging to the same ProSe Destination have the same transmission format.<br>For each MAC PDU associated to the SCI:<br>Step 1: Among the sidelink logical channels belonging to the selected ProSe Destination and having data available for transmission, allocate resources to the sidelink logical channel with the highest priority;<br>Step 2: if any resources remain, sidelink logical channels belonging to the selected ProSe Destination are served in decreasing order of priority until either the data for the sidelink logical channel(s) or the SL grant is exhausted, whichever comes first. Sidelink logical channels configured with equal priority should be served equally.<br>The UE shall also follow the rules below during the scheduling procedures above:<br>the UE should not segment an RLC SDU (or partially transmitted SDU) if the whole SDU (or partially transmitted SDU) fits into the remaining resources;<br>if the UE segments an RLC SDU from the sidelink logical channel, it shall maximize the size of the segment to fill the grant as much as possible;<br>the UE should maximise the transmission of data;<br>if the MAC entity is given a sidelink grant size that is equal to or larger than 10 bytes (for sidelink communication) or 11 bytes (for V2X sidelink communication) while having data available for transmission, the MAC entity shall not transmit only padding. |

According to some embodiments of the present disclosure, UE may perform fast and reliable sidelink communication with another UE by performing Tx carrier (re)selection if the maximum number of HARQ retransmissions, has been reached, by excluding carrier(s) where the maximum number of HARQ retransmissions, has been reached on resource and by considering stored selected carriers as candidate carrier.

According to some embodiments of the present disclosure, the system may provide fast and reliable sidelink communication for a UE performing sidelink communication with another UE. Since, the system may provide fast and reliable sidelink communication in the case the maximum number of HARQ retransmissions, has been reached.

Figure 13:
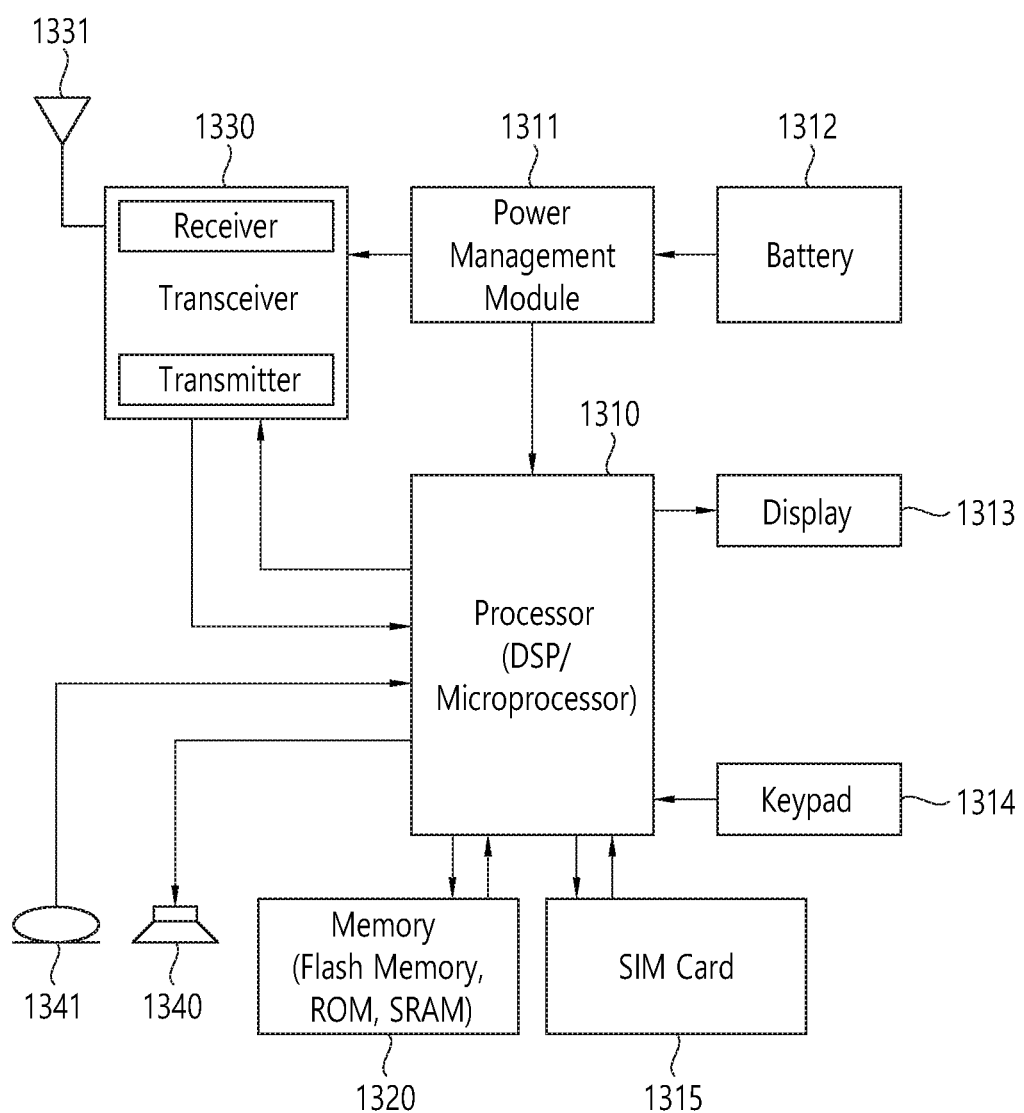
FIG. 13 shows a method for reselecting a TX carrier, according to some embodiments of the present disclosure.

FIG. 13 shows a method for reselecting a TX carrier, according to some embodiments of the present disclosure. The present disclosure described above for UE side may be applied to this embodiment.

A UE includes a processor 1310, a power management module 1311, a battery 1312, a display 1313, a keypad 1314, a subscriber identification module (SIM) card 1315, a memory 1320, a transceiver 1330, one or more antennas 1331, a speaker 1340, and a microphone 1341.

The processor 1310 may be configured to implement proposed functions, procedures and/or methods described in this description. Layers of the radio interface protocol may be implemented in the processor 1310. The processor 1310 may include application-specific integrated circuit (ASIC), other chipset, logic circuit and/or data processing device. The processor 1310 may be an application processor (AP). The processor 1310 may include at least one of a digital signal processor (DSP), a central processing unit (CPU), a graphics processing unit (GPU), a modem (modulator and demodulator). An example of the processor 1310 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 1311 manages power for the processor 1310 and/or the transceiver 1330. The battery 1312 supplies power to the power management module 1311. The display 1313 outputs results processed by the processor 1310. The keypad 1314 receives inputs to be used by the processor 1310. The keypad 1314 may be shown on the display 1313. The SIM card 1315 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1320 is operatively coupled with the processor 1310 and stores a variety of information to operate the processor 1310. The memory 1320 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1320 and executed by the processor 1310. The memory 1320 can be implemented within the processor 1310 or external to the processor 1310 in which case those can be communicatively coupled to the processor 1310 via various means as is known in the art.

The transceiver 1330 is operatively coupled with the processor 1310, and transmits and/or receives a radio signal. The transceiver 1330 includes a transmitter and a receiver. The transceiver 1330 may include baseband circuitry to process radio frequency signals. The transceiver 1330 controls the one or more antennas 1331 to transmit and/or receive a radio signal.

The speaker 1340 outputs sound-related results processed by the processor 1310. The microphone 1341 receives sound-related inputs to be used by the processor 1310.

According to some embodiments of the present disclosure, the processor 1310 may be configured to be coupled operably with the memory 1320 and the transceiver 1330. The processor 1310 may be configured to select a first carrier upon which the UE performs first sidelink transmission based on the first carrier to a target UE. The processor 1310 may be configured to detect a number of retransmissions unacknowledged on the first carrier. The processor 1310 may be configured to control the transceiver 1330 to perform second sidelink transmission to the target UE based on a second carrier different from the first carrier.

According to some embodiments of the present disclosure, the processor 1310 may be configured to control the transceiver 1330 to transmit a feedback message to the target UE, when the detected number of retransmissions unacknowledged has been reached to a maximum number of retransmissions.

According to some embodiments of the present disclosure, the processor 1310 may be configured to select candidate carriers with selecting the first carrier. The processor 1310 may be configured to control the memory 1320 to store the candidate carriers. The processor 1310 may be configured to monitor the candidate carriers stored in the memory 1320.

According to some embodiments of the present disclosure shown in FIG. 13, a processor 1310 of the UE and/or the target UE may consider a number of retransmissions unacknowledged (for example, HARQ NACK) as a condition for triggering TX carrier reselection. A processor 1310 of the UE and/or the target UE may consider that TX carrier reselection may be required when a number of retransmissions unacknowledged has been reached to a maximum number of retransmissions on any resource indicated in a configured sidelink grant of a certain carrier.

In addition, according to some embodiments of the present disclosure shown in FIG. 13, a processor 1310 of the UE and/or the target UE may exclude the carrier on which the maximum number or retransmissions unacknowledged has been reached for reselecting TX carrier. Furthermore, a memory 1320 of the UE and/or the target UE may erase the carrier on which the maximum number or retransmissions unacknowledged has been reached from a group of candidate carrier for sidelink communication.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

<Robot>

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

<Autonomous-Driving/Self-Driving>

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

<XR>

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 14:
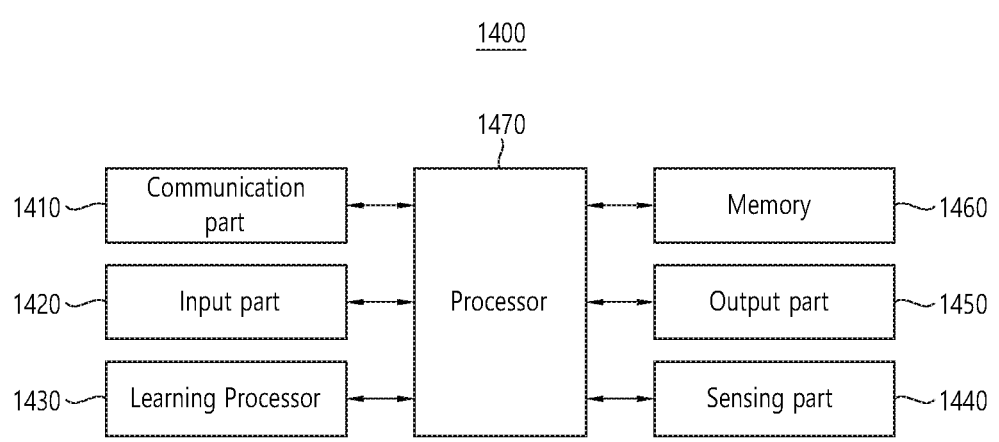
FIG. 14 shows an example of an AI device to which the technical features of the present disclosure can be applied.

FIG. 14 shows an example of an AI device to which the technical features of the present disclosure can be applied.

The AI device 1400 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 14, the AI device 1400 may include a communication part 1410, an input part 1420, a learning processor 1430, a sensing part 1440, an output part 1450, a memory 1460, and a processor 1470.

The communication part 1410 can transmit and/or receive data to and/or from external devices such as the AI devices and the AI server using wire and/or wireless communication technology. For example, the communication part 1410 can transmit and/or receive sensor information, a user input, a learning model, and a control signal with external devices. The communication technology used by the communication part 1410 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1420 can acquire various kinds of data. The input part 1420 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1420 can acquire input data to be used when acquiring an output using learning data and a learning model for model learning. The input part 1420 may obtain raw input data, in which case the processor 1470 or the learning processor 1430 may extract input features by preprocessing the input data.

The learning processor 1430 may learn a model composed of an ANN using learning data. The learned ANN can be referred to as a learning model. The learning model can be used to infer result values for new input data rather than learning data, and the inferred values can be used as a basis for determining which actions to perform. The learning processor 1430 may perform AI processing together with the learning processor of the AI server. The learning processor 1430 may include a memory integrated and/or implemented in the AI device 1400. Alternatively, the learning processor 1430 may be implemented using the memory 1460, an external memory directly coupled to the AI device 1400, and/or a memory maintained in an external device.

The sensing part 1440 may acquire at least one of internal information of the AI device 1400, environment information of the AI device 1400, and/or the user information using various sensors. The sensors included in the sensing part 1440 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1450 may generate an output related to visual, auditory, tactile, etc. The output part 1450 may include a display unit for outputting visual information, a speaker for outputting auditory information, and/or a haptic module for outputting tactile information.

The memory 1460 may store data that supports various functions of the AI device 1400. For example, the memory 1460 may store input data acquired by the input part 1420, learning data, a learning model, a learning history, etc.

The processor 1470 may determine at least one executable operation of the AI device 1100 based on information determined and/or generated using a data analysis algorithm and/or a machine learning algorithm. The processor 1470 may then control the components of the AI device 1100 to perform the determined operation. The processor 1470 may request, retrieve, receive, and/or utilize data in the learning processor 1430 and/or the memory 1460, and may control the components of the AI device 1400 to execute the predicted operation and/or the operation determined to be desirable among the at least one executable operation. The processor 1470 may generate a control signal for controlling the external device, and may transmit the generated control signal to the external device, when the external device needs to be linked to perform the determined operation. The processor 1470 may obtain the intention information for the user input and determine the user's requirements based on the obtained intention information. The processor 1470 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1430 and/or learned by the learning processor of the AI server, and/or learned by their distributed processing. The processor 1470 may collect history information including the operation contents of the AI device 1400 and/or the user's feedback on the operation, etc. The processor 1470 may store the collected history information in the memory 1460 and/or the learning processor 1430, and/or transmit to an external device such as the AI server. The collected history information can be used to update the learning model. The processor 1470 may control at least some of the components of AI device 1400 to drive an application program stored in memory 1460. Furthermore, the processor 1470 may operate two or more of the components included in the AI device 1100 in combination with each other for driving the application program.

Figure 15:
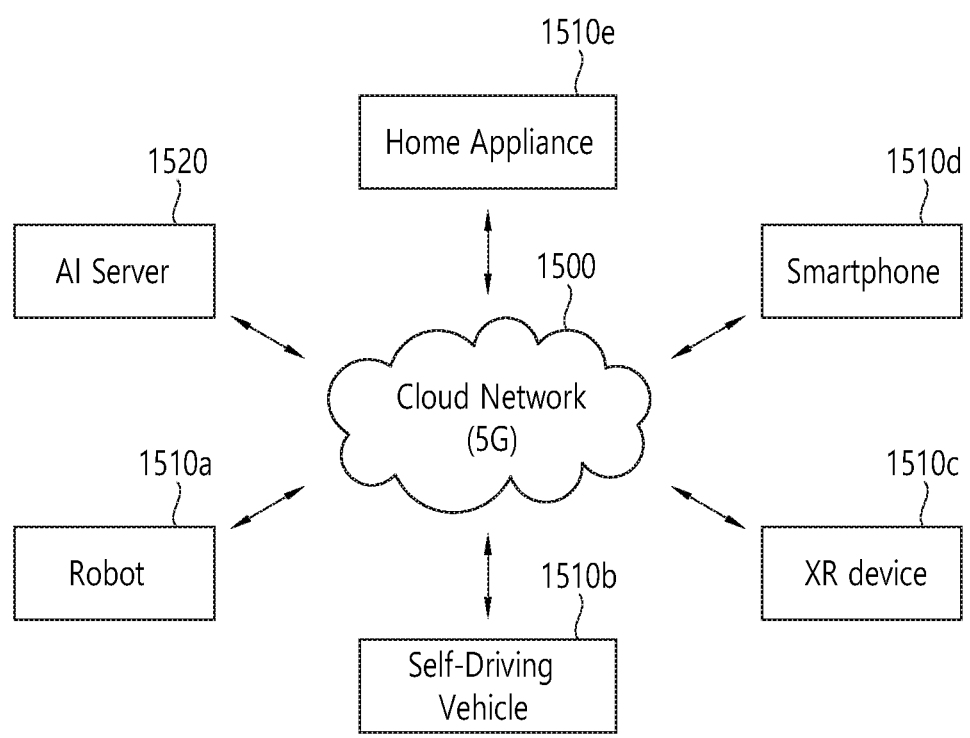
FIG. 15 shows an example of an AI system to which the technical features of the present disclosure can be applied.

FIG. 15 shows an example of an AI system to which the technical features of the present disclosure can be applied.

Referring to FIG. 15, in the AI system, at least one of an AI server 1520, a robot 1510a, an autonomous vehicle 1510b, an XR device 1510c, a smartphone 1510d and/or a home appliance 1510e is connected to a cloud network 1500. The robot 1510a, the autonomous vehicle 1510b, the XR device 1510c, the smartphone 1510d, and/or the home appliance 1510e to which the AI technology is applied may be referred to as AI devices 1510a to 1510e.

The cloud network 1500 may refer to a network that forms part of a cloud computing infrastructure and/or resides in a cloud computing infrastructure. The cloud network 1500 may be configured using a 3G network, a 4G or LTE network, and/or a 5G network. That is, each of the devices 1510a to 1510e and 1520 consisting the AI system may be connected to each other through the cloud network 1500. In particular, each of the devices 1510a to 1510e and 1520 may communicate with each other through a base station, but may directly communicate with each other without using a base station.

The AI server 1520 may include a server for performing AI processing and a server for performing operations on big data. The AI server 1520 is connected to at least one or more of AI devices constituting the AI system, i.e. the robot 1510a, the autonomous vehicle 1510b, the XR device 1510c, the smartphone 1510d and/or the home appliance 1510e through the cloud network 1500, and may assist at least some AI processing of the connected AI devices 1510a to 1510e. The AI server 1520 can learn the ANN according to the machine learning algorithm on behalf of the AI devices 1510a to 1510e, and can directly store the learning models and/or transmit them to the AI devices 1510a to 1510e. The AI server 1520 may receive the input data from the AI devices 1510a to 1510e, infer the result value with respect to the received input data using the learning model, generate a response and/or a control command based on the inferred result value, and transmit the generated data to the AI devices 1510a to 1510e. Alternatively, the AI devices 1510a to 1510e may directly infer a result value for the input data using a learning model, and generate a response and/or a control command based on the inferred result value.

Various embodiments of the AI devices 1510a to 1510e to which the technical features of the present disclosure can be applied will be described. The AI devices 1510a to 1510e shown in FIG. 15 can be seen as specific embodiments of the AI device 1400 shown in FIG. 14.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a source wireless device in a wireless communication system, the method comprising:
   initiating a sidelink communication procedure with a target wireless device;
   transmitting, to the target wireless device, a first candidate carrier for the sidelink communication procedure;
   receiving, from the target wireless device, a second candidate carrier for the sidelink communication procedure;
   storing the first candidate carrier and the second candidate carrier as candidate carriers;
   selecting a first carrier among the stored candidate carriers for the sidelink communication procedure;
   informing the selected first carrier to the target wireless device;
   performing the sidelink communication procedure with the target wireless device based on the first carrier;
   receiving, from the target wireless device, a message for requesting a carrier reselection for the sidelink communication procedure, wherein the message informs that the target wireless device received a maximum number of retransmissions of Hybrid Automatic Repeat Request (HARQ) un-acknowledgements (HARQ NACKs) from the source wireless device in response to a data transmitted via the first carrier;

reselecting a second carrier among the stored candidate carriers for the sidelink communication procedure, wherein the second carrier is different from the first carrier; and performing the sidelink communication procedure with the target wireless device based on the second carrier.

2. The method of claim 1, wherein the method further comprises, detecting, by the source wireless device, that a maximum number of HARQ retransmissions has been reached on the second carrier based on receiving a maximum number of retransmissions of HARQ NACKs from the target wireless device in response to a data transmitted via the second carrier; and transmitting, to the target wireless device, a feedback message informing that the maximum number of HARQ retransmissions has been reached.

3. The method of claim 2, wherein the feedback message includes a logical channel identities (IDs) where the maximum number of HARQ retransmissions has been reached.

4. The method of claim 1, wherein the method further comprises:

monitoring at least one of Reference Signal Received Power (RSRP), Reference Signal Received Quality (RSRQ), or Channel Busy Rate (CBR) of the candidate carriers.

5. The method of claim 1, wherein the sidelink communication procedure is performed via at least one of unicast, groupcast, or broadcast manner.

6. The method of claim 1, wherein the source wireless device is an autonomous driving apparatus in communication with at least one of a mobile terminal, a network, or autonomous vehicles other than the source wireless device.

7. A source wireless device in a wireless communication system, the source wireless device comprising:

a memory;

a transceiver; and a processor, operably coupled to the memory and the transceiver, and configured to:

initiate a sidelink communication procedure with a target wireless device;

control the transceiver to transmit, to the target wireless device, a first candidate carrier for the sidelink communication procedure;

control the transceiver to receive, from the target wireless device, a second candidate carrier for the sidelink communication procedure;

store the first candidate carrier and the second candidate carrier as candidate carriers;

select a first carrier among the stored candidate carriers for the sidelink communication procedure;

control the transceiver to inform the selected first carrier to the target wireless device;

control the transceiver to perform the sidelink communication procedure with the target wireless device based on the first carrier;

control the transceiver to receive, from the target wireless device, a message for requesting a carrier reselection for the sidelink communication procedure, wherein the message informs that the target wireless device received a maximum number of retransmissions of Hybrid Automatic Repeat Request (HARQ) un-acknowledgements (HARQ NACKs) from the source wireless device in response to a data transmitted via the first carrier;

reselect a second carrier among the stored candidate carriers for the sidelink communication procedure, wherein the second carrier is different from the first carrier; and control the transceiver to perform the sidelink communication procedure with the target wireless device based on the second carrier.

\* \* \* \* \*